US012609123B2

(12) United States Patent
Yeung et al.

(10) Patent No.: US 12,609,123 B2
(45) Date of Patent: Apr. 21, 2026

(54) AUDIO PROCESSING METHOD AND APPARATUS

(71) Applicants: HUAWEI TECHNOLOGIES CO., LTD., Shenzhen (CN); University of Science and Technology of China, Hefei (CN)

(72) Inventors: Yu Ting Yeung, Hong Kong (CN); Guangping Xu, Shenzhen (CN); Li Qian, Shenzhen (CN); Jun Du, Hefei (CN)

(73) Assignees: Huawei Technologies Co., Ltd., Shenzhen (CN); University of Science and Technology of China, Hefei (CN)

(*) Notice: Subject to any disclaimer, the term of this patent is extended or adjusted under 35 U.S.C. 154(b) by 297 days.

(21) Appl. No.: 18/178,376

(22) Filed: Mar. 3, 2023

(65) Prior Publication Data

US 2023/0206928 A1 Jun. 29, 2023

Related U.S. Application Data

(63) Continuation of application No. PCT/CN2021/100645, filed on Jun. 17, 2021.

(30) Foreign Application Priority Data

Sep. 4, 2020 (CN) .......................... 202010920160.3

(51) Int. Cl.
*G10L 17/22* (2013.01)
*G06F 16/63* (2019.01)
(Continued)

(52) U.S. Cl.
CPC .............. *G10L 17/22* (2013.01); *G06F 16/63* (2019.01); *G10L 17/02* (2013.01); *G10L 21/028* (2013.01);
(Continued)

(58) Field of Classification Search
CPC ......... G10L 25/78; G10L 15/26; G10L 17/00; G10L 21/0272; G10L 15/22; H04S 3/008; H04S 2400/01; G06F 40/30
See application file for complete search history.

(56) References Cited

U.S. PATENT DOCUMENTS

2007/0133437 A1* 6/2007 Wengrovitz ............ H04M 3/56
704/E15.045
2019/0341050 A1 11/2019 Diamant et al.
(Continued)

FOREIGN PATENT DOCUMENTS

CN 110322872 A 10/2019
CN 111429937 A 7/2020
(Continued)

*Primary Examiner* — Daniel C Washburn
*Assistant Examiner* — Penny L Caudle
(74) *Attorney, Agent, or Firm* — Leydig, Voit & Mayer, Ltd.

(57) ABSTRACT

An audio processing method and an electronic apparatus are provided. The audio processing method is applied to a conference system, and the conference system includes at least one audio capturing device. The audio processing method includes: receiving at least one segment of audio captured by the at least one audio capturing device; determining voices of a plurality of targets in the at least one segment of audio; and performing voice recognition on a voice of each of the plurality of targets, to obtain semantics corresponding to the voice of each target. Voice recognition is separately performed on voices of different targets, thereby improving accuracy of voice recognition.

20 Claims, 17 Drawing Sheets

(51) Int. Cl.
| | |
|---|---|
| *G10L 17/02* | (2013.01) |
| *G10L 21/028* | (2013.01) |
| *G10L 25/78* | (2013.01) |
| *H04S 3/00* | (2006.01) |

(52) U.S. Cl.
CPC .............. *G10L 25/78* (2013.01); *H04S 3/008* (2013.01); *H04S 2400/01* (2013.01)

(56) References Cited

U.S. PATENT DOCUMENTS

| | | | |
|---|---|---|---|
| 2019/0341055 | A1 | 11/2019 | Krupka et al. |
| 2019/0341058 | A1 | 11/2019 | Zhang et al. |

FOREIGN PATENT DOCUMENTS

| | | | | |
|---|---|---|---|---|
| CN | 112183107 A | | 1/2021 | |
| WO | WO-2019183904 A1 | * | 10/2019 | |
| WO | WO-2020175293 A1 | * | 9/2020 | ............. G10L 17/00 |

* cited by examiner

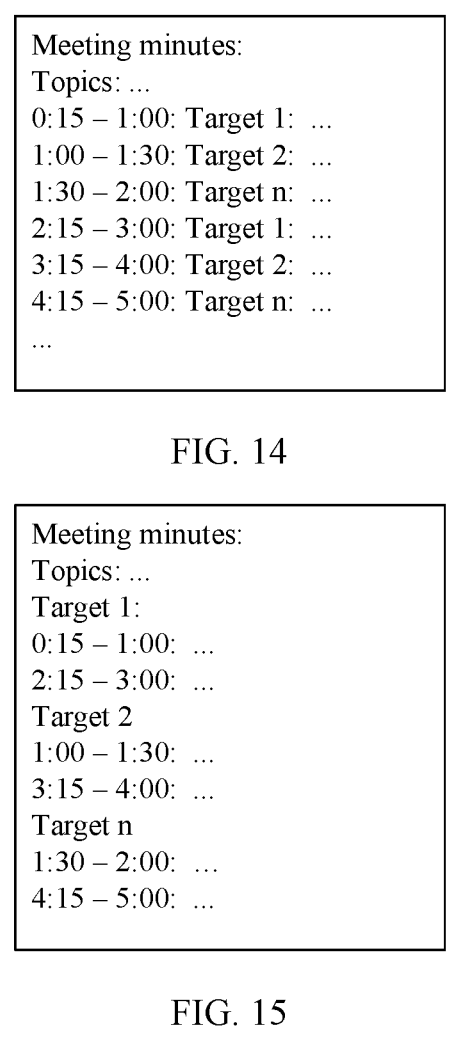

Meeting minutes:
Topics: ...
0:15 – 1:00: Target 1:  ...
1:00 – 1:30: Target 2:  ...
1:30 – 2:00: Target n:  ...
2:15 – 3:00: Target 1:  ...
3:15 – 4:00: Target 2:  ...
4:15 – 5:00: Target n:  ...

Meeting minutes:
Topics: ...
Target 1:
0:15 – 1:00:  ...
2:15 – 3:00:  ...
Target 2
1:00 – 1:30:  ...
3:15 – 4:00:  ...
Target n
1:30 – 2:00:  ...
4:15 – 5:00:  ...

FIG. 15

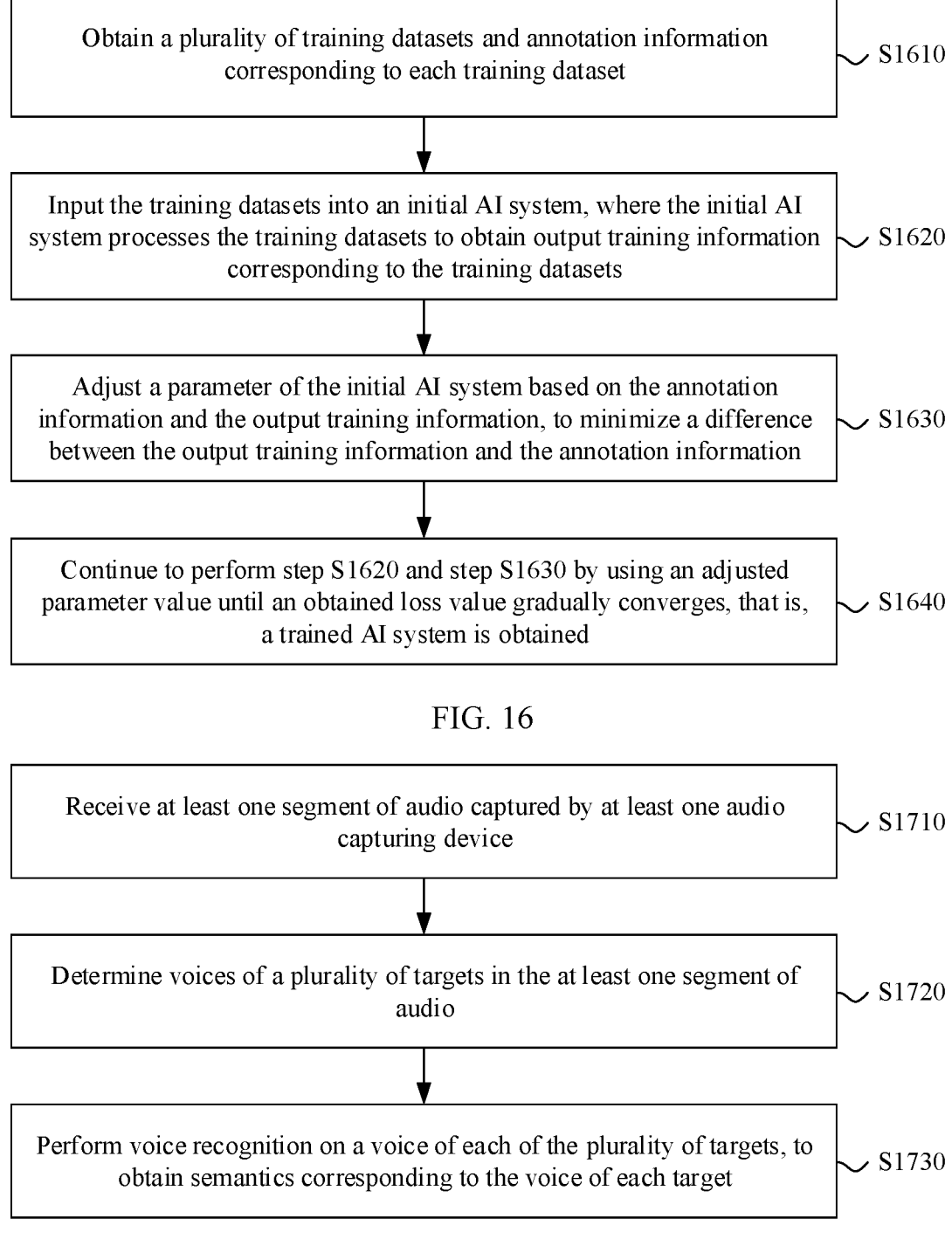

Obtain a plurality of training datasets and annotation information corresponding to each training dataset    S1610

Input the training datasets into an initial AI system, where the initial AI system processes the training datasets to obtain output training information corresponding to the training datasets    S1620

Adjust a parameter of the initial AI system based on the annotation information and the output training information, to minimize a difference between the output training information and the annotation information    S1630

Continue to perform step S1620 and step S1630 by using an adjusted parameter value until an obtained loss value gradually converges, that is, a trained AI system is obtained    S1640

FIG. 16

Receive at least one segment of audio captured by at least one audio capturing device    S1710

Determine voices of a plurality of targets in the at least one segment of audio    S1720

Perform voice recognition on a voice of each of the plurality of targets, to obtain semantics corresponding to the voice of each target    S1730

FIG. 17

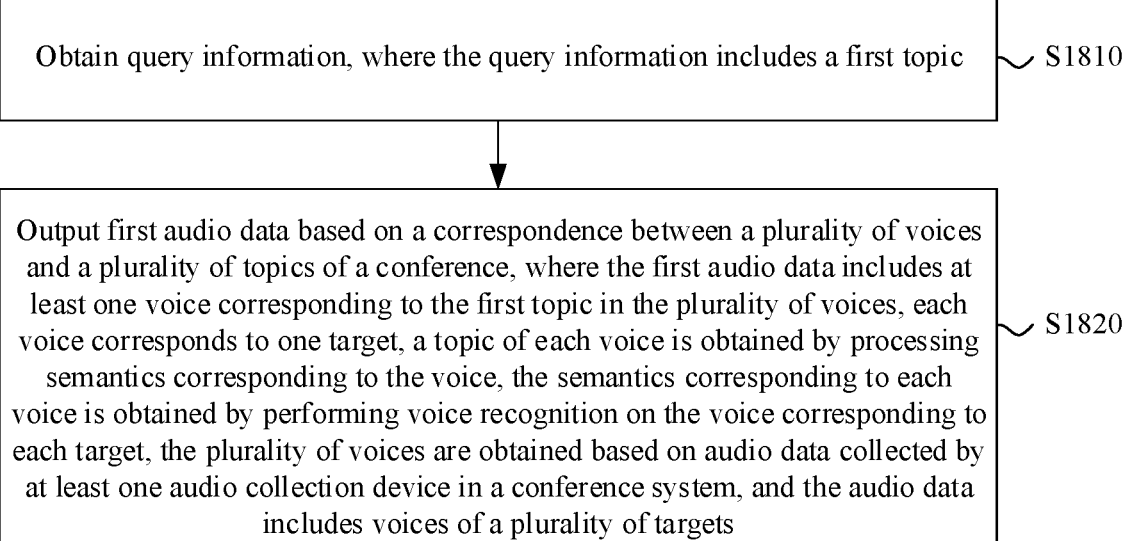

Obtain query information, where the query information includes a first topic          S1810

Output first audio data based on a correspondence between a plurality of voices and a plurality of topics of a conference, where the first audio data includes at least one voice corresponding to the first topic in the plurality of voices, each voice corresponds to one target, a topic of each voice is obtained by processing semantics corresponding to the voice, the semantics corresponding to each voice is obtained by performing voice recognition on the voice corresponding to each target, the plurality of voices are obtained based on audio data collected by at least one audio collection device in a conference system, and the audio data includes voices of a plurality of targets          S1820

FIG. 18

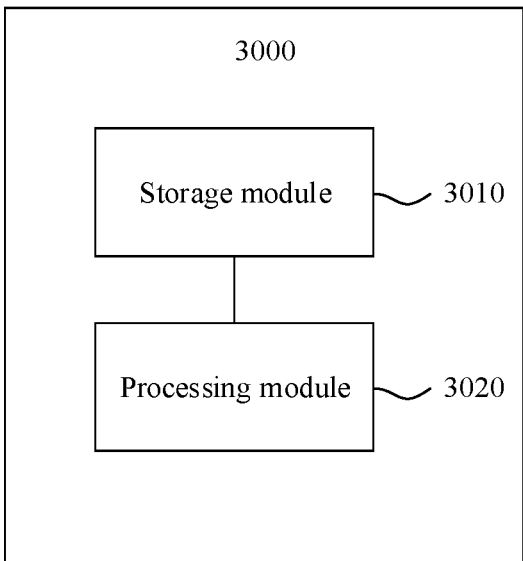

3000

Storage module          3010

Processing module          3020

FIG. 19

AUDIO PROCESSING METHOD AND APPARATUS

CROSS-REFERENCE TO RELATED APPLICATIONS

This application is a continuation of International Application No. PCT/CN2021/100645, filed on Jun. 17, 2021, which claims priority to Chinese Patent Application No. 202010920160.3, filed on Sep. 4, 2020. The disclosures of the aforementioned applications are hereby incorporated by reference in their entireties.

TECHNICAL FIELD

Embodiments of this application relate to the field of artificial intelligence (AI), specifically relates to the field of natural language processing, and in particular, to an audio processing method and apparatus.

BACKGROUND

Artificial intelligence (AI) refers to a theory, method, technology, and application system that are used to simulate, extend, and expand human intelligence by using a digital computer or a machine controlled by a digital computer, to perceive an environment, obtain knowledge, and obtain an optimal result based on the knowledge. In other words, artificial intelligence is a branch of computer science and attempts to understand essence of intelligence and produce a new intelligent machine that can react in a similar manner to human intelligence. Artificial intelligence is to research design principles and implementation methods of various intelligent machines, so that the machines have perception, inference, and decision-making functions. Research in the field of artificial intelligence includes robotics, natural language processing, computer vision, decision-making and inference, human-machine interaction, recommendation and search, AI basic theories, and the like.

With continuous development of artificial intelligence technologies, a natural language human-machine interaction system that enables human-machine interaction to be performed by using a natural language becomes increasingly important. The human-machine interaction to be performed by using the natural language requires the system to recognize a specific meaning of a human natural language. Generally, the system extracts key information from a natural language sentence to recognize a specific meaning of the sentence.

In a broad sense, natural language processing includes voice processing. Voice recognition is performed according to a sequence of voices in audio, and therefore accuracy of determined semantics is low.

SUMMARY

This application provides an audio processing method and apparatus, to improve accuracy of semantics obtained by performing voice recognition on a voice of each target in audio captured by a system.

According to a first aspect, an audio processing method is provided. The method may be applied to a conference system, and the conference system includes at least one audio capturing device. The method includes: receiving at least one segment of audio captured by the at least one audio capturing device; determining voices of a plurality of targets in the at least one segment of audio; and performing voice recognition on a voice of each of the plurality of targets, to obtain semantics corresponding to the voice of each target.

In a period of time, semantics corresponding to voices of one target is generally logically associated. During a conference, a plurality of targets may speak alternately, that is, a voice of each target appears alternately. Dependency between pre- and post-statements of one target is stronger. The voice of each target is processed, so that accuracy of voice recognition can be improved.

With reference to the first aspect, in some possible implementations, the determining voices of a plurality of targets in the at least one segment of audio includes: determining whether a to-be-processed voice is a voice of a first target in the plurality of targets, where the to-be-processed voice is determined from the at least one segment of audio; when the to-be-processed voice is not the voice of the first target, performing voice separation on the to-be-processed voice to obtain a separated voice; and recognizing a target corresponding to the separated voice.

During a conference, voice overlapping occurs only in a few cases. In most cases, voice overlapping does not occur. To recognize the voice of each target, a target corresponding to each non-overlapping voice and a target corresponding to each separated voice need to be determined. Target recognition may be performed on each to-be-processed voice. Then, for voice separation performed on a to-be-processed voice that is not corresponding to the target, there is no need to perform overlap detection or voice separation on each to-be-processed voice, thereby reducing resource occupation.

With reference to the first aspect, in some possible implementations, the method further includes: when the to-be-processed voice is not the voice of the first target, determining whether voice overlapping exists in the to-be-processed voice; and the performing voice separation on the to-be-processed voice includes: when voice overlapping exists in the to-be-processed voice, performing voice separation on the to-be-processed voice.

Overlap detection is performed on the to-be-processed voice that is not corresponding to the target, and voice separation is performed when voice overlapping exists in the to-be-processed voice, thereby further reducing resource occupation.

With reference to the first aspect, in some possible implementations, the method further includes: obtaining a to-be-detected voice; performing voice recognition on the to-be-detected voice to determine semantics of the to-be-detected voice; when the semantics of the to-be-detected voice is preset content, performing feature extraction on the to-be-detected voice to obtain a voice feature of the first target; and the determining whether a to-be-processed voice is a voice of a first target includes: determining, based on the voice feature of the first target, whether the to-be-processed voice is the voice of the first target.

The to-be-detected voice is obtained, and when the semantics of the to-be-detected voice is the preset content, the voice feature of the to-be-detected voice is used as the voice feature of the first target, so that a manner of accurately determining the voice feature of the target is provided.

When it is determined that the semantics of the to-be-detected voice is the preset content, it is determined that the to-be-detected voice is the voice of the first target. In addition, an identifier of the first target may be further obtained. The identifier of the first target may be a name, an identification (ID) number, or the like of the first target. In this way, meeting minutes may include the obtained identifier of the first target, thereby facilitating query of the meeting minutes.

With reference to the first aspect, in some possible implementations, the determining voices of a plurality of targets in the at least one segment of audio includes: determining a plurality of segments of continuous voices in the at least one segment of audio according to a voice status detection VAD algorithm; and determining the voice of each of the plurality of targets from the plurality segments of continuous voices.

The continuous voices can be determined according to the VAD algorithm. The voice of each target is determined from the continuous voices, so that resource occupation can be reduced.

With reference to the first aspect, in some possible implementations, the at least one audio capturing device includes a plurality of terminal devices, and the at least one segment of audio includes audio captured by each terminal device; and the determining voices of a plurality of targets in the at least one segment of audio includes: processing the plurality of segments of audio according to a multi-channel filter algorithm to obtain denoised audio; and determining the voices of the plurality of targets from the denoised audio.

During the conference, a plurality of terminal devices carried by participants may be used to capture audio, and a plurality of segments of audio captured by the plurality of terminal devices are denoised according to the multi-channel filter algorithm, thereby implementing denoising and reducing a requirement on an audio capturing device.

With reference to the first aspect, in some possible implementations, the method further includes: obtaining time information of each of the plurality of segments of audio to implement time synchronization of the plurality of segments of audio; and the processing the plurality of segments of audio according to a multi-channel filter algorithm includes: processing, according to the multi-channel filter algorithm, the plurality of synchronized segments of audio.

Time synchronization of the plurality of segments of audio is implemented based on time information of each segment of audio, so that effect of denoising the plurality of segments of audio can be improved.

With reference to the first aspect, in some possible implementations, the performing voice recognition on a voice of each of the plurality of targets includes: inputting the voices of the plurality of targets into a plurality of voice recognition models, where the plurality of voice recognition models are used for concurrent voice recognition.

Voice recognition is concurrently performed, so that voice recognition efficiency can be improved.

With reference to the first aspect, in some possible implementations, the method further includes: outputting meeting minutes, where the meeting minutes include the semantics corresponding to the voice of each target.

The meeting minutes are output, which facilitates query of conference content.

With reference to the first aspect, in some possible implementations, the at least one segment of audio includes the plurality of segments of continuous voices; the determining voices of a plurality of targets in the at least one segment of audio includes: determining a voice of at least one target in each segment of the continuous voice; and the method further includes: processing semantics corresponding to a voice of each target in each segment of the continuous voice, to obtain a topic corresponding to the voice of each target in each segment of the continuous voice.

The topic corresponding to the voice of each target in each segment of the continuous voice is determined, so that it is convenient to query conference content. In addition, a voice corresponding to the voice of each target is obtained by separately performing voice recognition on the voices of the plurality of targets, and semantics processing is performed on the voice, to obtain a topic corresponding to each voice, so that a more accurate topic is determined.

With reference to the first aspect, in some possible implementations, the method further includes: obtaining first query information, where the first query information includes topic information indicating a first topic; and outputting first audio data based on the topic corresponding to the voice of each target in each segment of the continuous voice, where the first audio data includes at least one voice corresponding to the first topic.

Audio data corresponding to one topic is output, which facilitates query of conference content.

With reference to the first aspect, in some possible implementations, the method further includes: obtaining second query information, where the second query information includes target information indicating a second target in the plurality of targets; and outputting second audio data, where the second audio data includes a voice of the second target.

Audio data corresponding to one target is output, which facilitates query of conference content.

The semantics is obtained by performing voice recognition on the voice of each of the plurality of targets. In other words, in this application, voices are stored and processed based on different targets. Therefore, in the solution of this application, a voice segment corresponding to each target may be obtained.

Therefore, for a query manner in which query information further includes the target information, processing is easier.

According to a second aspect, a query method is provided, including: obtaining query information, where the query information includes topic information indicating a first topic; and outputting first audio data based on a correspondence between a plurality of voices and a plurality of topics, where the first audio data includes at least one voice corresponding to the first topic in the plurality of voices, each of the plurality of voices corresponds to one target, a topic of each voice is obtained by processing semantics corresponding to the voice, the semantics corresponding to each voice is obtained by performing voice recognition on the voice corresponding to each target, the plurality of voices are obtained based on audio data captured by at least one audio capturing device in a conference system, and the audio data includes voices of a plurality of targets.

In a period of time, semantics corresponding to voices of one target is generally logically associated. During a conference, a plurality of targets may speak alternately, that is, a voice of each target appears alternately. Dependency between pre- and post-statements of one target is stronger. The voice of each target is separately processed, so that accuracy of voice recognition can be improved.

Audio data corresponding to one topic is output, which facilitates query of conference content.

With reference to the second aspect, in some possible implementations, the query information further includes target information indicating a first target, and the at least one voice in the first audio data is a voice of the first target.

Audio data corresponding to one target is output, which facilitates query of conference content.

In this application, voices are stored and processed based on different targets. Therefore, an independent voice segment of each target may be obtained.

According to a third aspect, an audio processing apparatus is provided, and may be applied to a conference system. The conference system includes at least one audio capturing device. The audio processing apparatus includes a storage module and a processing module, where the storage module is configured to store program instructions. When the program instructions are executed in the processing module, the processing module is configured to receive at least one segment of audio captured by the at least one audio capturing device; the processing module is further configured to determine voices of a plurality of targets in the at least one segment of audio; and the processing module is further configured to perform voice recognition on a voice of each of the plurality of targets, to obtain semantics corresponding to the voice of each target.

With reference to the third aspect, in some possible implementations, the processing module is further configured to determine whether a to-be-processed voice is a voice of a first target in the plurality of targets, where the to-be-processed voice is determined from the at least one segment of audio. The processing module is further configured to: when the to-be-processed voice is not the voice of the first target, perform voice separation on the to-be-processed voice to obtain a separated voice. The processing module is further configured to recognize a target corresponding to the separated voice.

With reference to the third aspect, in some possible implementations, the processing module is further configured to: when the to-be-processed voice is not the voice of the first target, determine whether voice overlapping exists in the to-be-processed voice. The processing module is further configured to: when voice overlapping exists in the to-be-processed voice, perform voice separation on the to-be-processed voice.

With reference to the third aspect, in some possible implementations, the processing module is further configured to obtain a to-be-detected voice. The processing module is further configured to perform voice recognition on the to-be-detected voice to determine semantics of the to-be-detected voice. The processing module is further configured to: when the semantics of the to-be-detected voice is preset content, perform feature extraction on the to-be-detected voice to obtain a voice feature of the first target. The processing module is further configured to determine, based on the voice feature of the first target, whether the to-be-processed voice is the voice of the first target.

With reference to the third aspect, in some possible implementations, the processing module is further configured to determine a plurality of segments of continuous voices in the at least one segment of audio according to a voice status detection VAD algorithm. The processing module is further configured to determine the voice of each of the plurality of targets from the plurality segments of continuous voices.

With reference to the third aspect, in some possible implementations, the at least one audio capturing device includes a plurality of terminal devices, and the at least one segment of audio includes audio captured by each terminal device. The processing module is further configured to process the plurality of segments of audio according to a multi-channel filter algorithm to obtain denoised audio. The processing module is further configured to determine the voices of the plurality of targets from the denoised audio.

With reference to the third aspect, in some possible implementations, the processing module is further configured to obtain time information of each of the plurality of segments of audio to implement time synchronization of the plurality of segments of audio. That the processing module is further configured to process the plurality of segments of audio according to a multi-channel filter algorithm includes: processing, according to the multi-channel filter algorithm, the plurality of synchronized segments of audio.

With reference to the third aspect, in some possible implementations, the processing module is further configured to input the voices of the plurality of targets into a plurality of voice recognition models, where the plurality of voice recognition models are used for concurrent voice recognition.

With reference to the third aspect, in some possible implementations, the processing module is further configured to output meeting minutes, where the meeting minutes include the semantics corresponding to the voice of each target.

With reference to the third aspect, in some possible implementations, the at least one audio includes a plurality of segments of continuous voices. The processing module is further configured to determine a voice of at least one target from each segment of the continuous voice. The processing module is further configured to process semantics corresponding to a voice of each target in each segment of the continuous voice, to obtain a topic corresponding to the voice of each target in each segment of the continuous voice.

With reference to the third aspect, in some possible implementations, the processing module is further configured to obtain first query information, where the first query information includes topic information indicating a first topic. The processing module is further configured to output audio data based on the topic corresponding to the voice of each target in each segment of the continuous voice, where the audio data includes at least one voice corresponding to the first topic.

With reference to the third aspect, in some possible implementations, the method further includes: obtaining second query information, where the second query information includes target information indicating a second target in the plurality of targets; and outputting second audio data, where the second audio data includes a voice of the second target.

According to a fourth aspect, a query apparatus is provided. The query apparatus includes a storage module and a processing module. The storage module is configured to store program instructions. When the program instructions are executed in the processing module, the processing module is configured to: obtain query information, where the query information includes topic information indicating a first topic; and the processing module is further configured to output first audio data based on a correspondence between a plurality of voices of a conference and a plurality of topics, where the first audio data includes at least one voice corresponding to the first topic in the plurality of voices, each voice corresponds to one target, a topic of each voice is obtained by processing semantics corresponding to the voice, the semantics corresponding to each voice is obtained by performing voice recognition on the voice corresponding to each target, the plurality of voices are obtained based on audio data captured by at least one audio capturing device in a conference system, and the audio data includes voices of a plurality of targets.

With reference to the fourth aspect, in some possible implementations, the query information further includes target information indicating a first target, and the at least one voice in the first audio data is a voice of the first target.

According to a fifth aspect, an electronic device is provided and includes a memory and a processor. The memory is configured to store a program. The processor is configured to execute the program stored in the memory, to perform the method in the first aspect or the second aspect.

It should be understood that the program may also be referred to as program code, a computer instruction, a program instruction, or the like.

According to a sixth aspect, a computer-readable storage medium is provided. The computer-readable storage medium stores a program, and the program includes instructions used to perform the steps in the method in the first aspect or the second aspect.

According to a seventh aspect, a computer program product is provided, where the computer program product includes computer instructions, and when the computer program product is executed by a computer, the computer performs the method in the first aspect or the second aspect.

According to an eighth aspect, a chip system is provided. The chip system includes at least one processor. When a program is executed in the at least one processor, the chip system is enabled to perform the method according to the first aspect or the second aspect.

Optionally, in an implementation, the chip system may further include a memory, the memory stores a program, the processor is configured to execute the program stored in the memory, and when the program is executed, the processor is configured to perform the method in the first aspect.

The foregoing chip system may be specifically a field programmable gate array (FPGA) or an application-specific integrated circuit (ASIC).

It should be understood that, in this application, the method in the first aspect may specifically refer to the method in any one of the first aspect or the implementations of the first aspect.

BRIEF DESCRIPTION OF DRAWINGS

FIG. 14 and FIG. 15 each are a schematic diagram of a format of meeting minutes according to an embodiment of this application;

FIG. 16 is a schematic flowchart of a method for training a neural network model required by an audio processing system according to an embodiment of this application;

FIG. 17 is a schematic flowchart of an audio processing method according to an embodiment of this application;

FIG. 18 is a schematic flowchart of an audio processing method according to an embodiment of this application;

FIG. 19 is a schematic diagram of a structure of an audio processing apparatus according to an embodiment of this application;

DESCRIPTION OF EMBODIMENTS

The following describes technical solutions of this application with reference to accompanying drawings.

All or some steps in an audio processing method provided in this embodiment of this application may be performed by a natural language processing system.

Figure 1A:
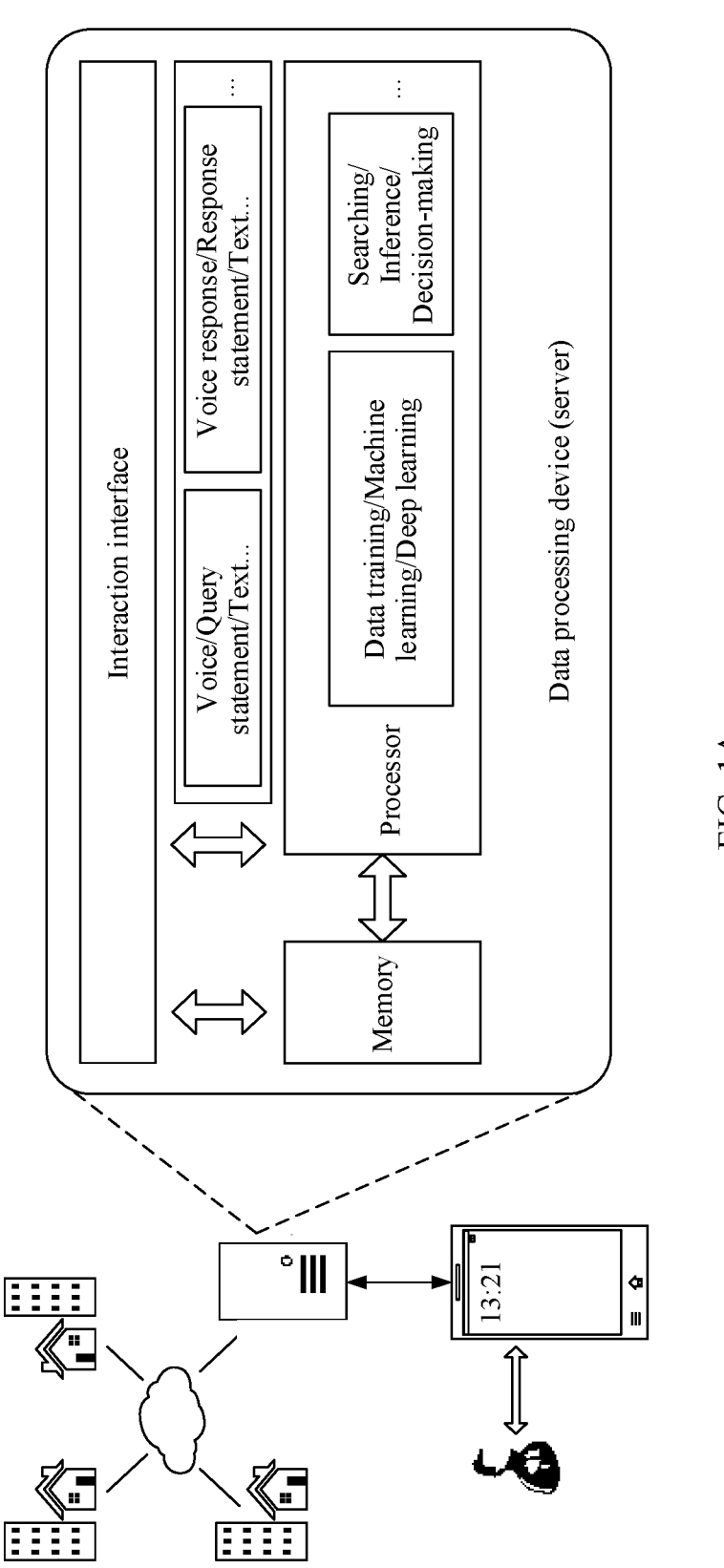
FIGS. 1A-1C are schematic diagrams of a structure of a system architecture of a natural language processing system according to an embodiment of this application.

As shown in FIG. 1A, a natural language processing system includes user equipment and a data processing device.

The user equipment includes a user and intelligent terminals such as a mobile phone, a personal computer, or an information processing center. The user equipment initiates natural language data processing. As an initiator of a request for language questioning and answering, querying, or the like, the user usually initiates the request by using the user equipment.

The data processing device may be a device or a server that has a data processing function, for example, a cloud server, a network server, an application server, or a management server. The data processing device receives, through an interaction interface, a question of a query statement, voice, text, or the like from the intelligent terminal, and then performs language data processing, by using a memory storing data and a processor processing data, including machine learning, deep learning, searching, inference, decision-making, or the like. The memory may be a general name, including a local storage and a database storing historical data. The database may reside in the data processing device, or may reside in another network server.

Figure 1B:
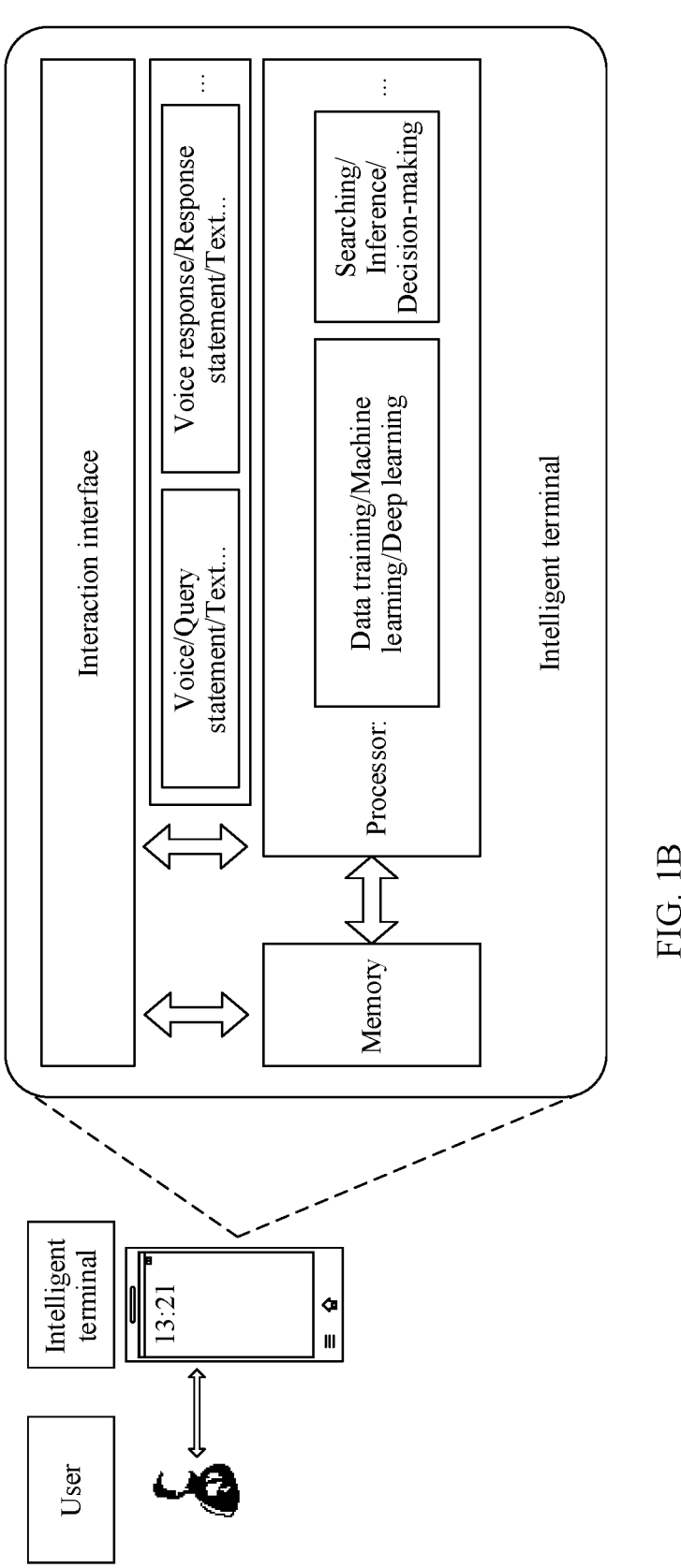

In FIG. 1B shows another application scenario of a natural language processing system. In this scenario, an intelligent terminal directly serves as a data processing device, directly receives an input from a user, and directly performs processing by using hardware of the intelligent terminal. A specific process is similar to that in FIG. 1A. For details, refer to the foregoing description. Details are not described herein again.

Figure 1C:
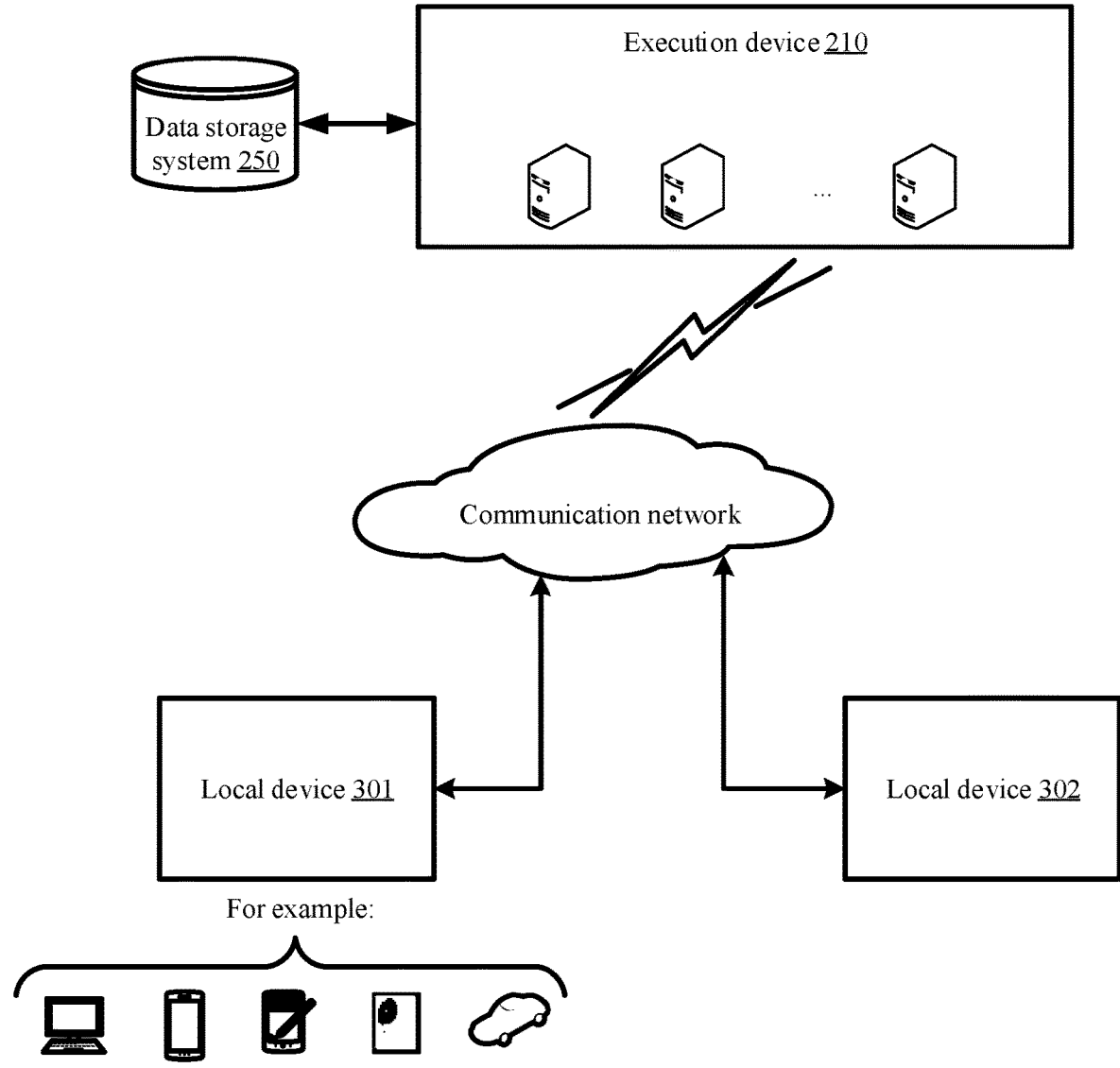

As shown in FIG. 1C, the user equipment may be a local device 301 or 302, and the data processing device may be an execution device 210. A data storage system 250 may be integrated into the execution device 210, or may be disposed in a cloud or another network server.

Embodiments of this application relate to related applications of a large quantity of neural networks. To better understand solutions of embodiments of this application, the following first describes related terms and concepts of neural networks that may be in embodiments of this application.

(1) Neural Network

A neural network may include a neural unit. The neural unit may be an operation unit that uses $x_s$ and an intercept 1 as inputs. An output of the operation unit may be shown in Formula (1-1):

$$h_{W,b}(x) = f(W^T x) = f\left(\sum_{s=1}^{n} W_s x_s + b\right) \qquad (1\text{-}1)$$

$s=1, 2, \ldots$, or n, n is a natural number greater than 1, $W_s$ is a weight of $x_s$, and b is a bias of the neural unit. f is an activation function (activation functions) of the neural unit, and is used to introduce a nonlinear feature into the neural network, to convert an input signal in the neural unit into an output signal. The output signal of the activation function may be used as an input of a next convolutional layer, and the activation function may be a sigmoid function. The neural network is a network constituted by connecting a plurality of single neurons together. To be specific, an output of a neuron may be an input to another neuron. An input of each neuron may be connected to a local receptive field of a previous layer to extract a feature of the local receptive field. The local receptive field may be a region including several neurons.

(2) Deep Neural Network

A deep neural network (DNN), also referred to as a multi-layer neural network, may be understood as a neural network having a plurality of hidden layers. The DNN is divided based on locations of different layers, so that the neural network in the DNN can be divided into three types: an input layer, hidden layers, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems complex, work of each layer is actually not complex. Work at each layer of a deep neural network may be described by using a mathematical expression $$\vec{y} = a(W \cdot \vec{x} + b).$$

From a physical layer, work at each layer of the deep neural network may be understood as completing transformation from input space to output space (namely, from row space to column space of a matrix) by performing five operations on the input space (a set of input vectors). The five operations are as follows: 1. dimension increasing/dimension reduction; 2. scaling up/scaling down; 3. rotation; 4. translation; and 5. "bending". The operation 1, the operation 2, and the operation 3 are performed by $$W \cdot \vec{x},$$

the operation 4 is performed by +b, and the operation 5 is performed by a( ). The word "space" is used herein for expression because a classified object is not a single thing, but a type of things. Space is a collection of all individuals of such type of things. W is a weight vector, and each value in the vector indicates a weight value of one neuron in the neural network at this layer. The vector W determines space transformation from the input space to the output space described above. In other words, a weight W at each layer controls how to transform space. A purpose of training the deep neural network is to finally obtain a weight matrix (a weight matrix formed by vectors W at a plurality of layers) at all layers of a trained neural network. Therefore, the training process of the neural network is essentially a manner of learning control of space transformation, and more specifically, learning a weight matrix.

Therefore, the DNN is as the following linear relational expression in brief:

$$\vec{y} = \alpha(W \cdot \vec{x} + \vec{b}),$$

where $$\vec{x}$$

is an input vector, $$\vec{y}$$

is an output vector, $$\vec{b}$$

is an offset vector, W is a weight matrix (also referred to as coefficients), and α( ) is an activation function. At each layer, the output vector $$\vec{x}$$

is obtained by performing such a simple operation on the input vector $$\vec{y}$$

Because there are a plurality of layers in the DNN, there are also a plurality of coefficients W and a plurality of bias vectors $$\vec{b}$$

Definitions of the parameters in the DNN are as follows: The coefficient W is used as an example. It is assumed that in a DNN with three layers, a linear coefficient from the fourth neuron at the second layer to the second neuron at the third layer is defined as $$W_{24}^{3}.$$

The superscript 3 indicates a layer at which the coefficient W is located, and the subscript corresponds to an output third-layer index 2 and an input second-layer index 4.

In conclusion, coefficients of a $k^{th}$ neuron at an $(L-1)^{th}$ layer to a $j^{th}$ neuron at an $L^{th}$ layer are defined as $$W_{jk}^{L}.$$

It should be noted that the input layer does not have the parameters W. In the deep neural network, more hidden layers make the network more capable of describing a complex case in the real world. Theoretically, a model with more parameters indicates higher complexity and a larger "capacity", and indicates that the model can be used to complete a more complex learning task. A process of training the deep neural network is a process of learning a weight matrix, and a final objective of training is to obtain a weight matrix (a weight matrix formed by vectors W at a plurality of layers) at all layers of a trained deep neural network.

(3) Convolutional Neural Network

A convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units at a same feature plane share a weight, and the weight shared herein is a convolution kernel. Weight sharing may be understood as that an audio information extraction manner is irrelevant to a location. The convolution kernel may be initialized in a form of a matrix of a random size. In a training process of the convolutional neural network, the convolution kernel may obtain a reasonable weight through learning. In addition, benefits directly brought by weight sharing are that connections among layers of the convolutional neural network are reduced, and an overfitting risk is reduced.

(4) A recurrent neural network (RNN) is used for processing sequence data. A conventional neural network model starts from an input layer to a hidden layer and then to an output layer, and the layers are fully connected, while nodes in each layer are unconnected. Such a common neural network resolves many problems, but is still incapable of resolving many other problems. For example, if a word in a sentence is to be predicted, a previous word usually needs to be used, because adjacent words in the sentence are related. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN.

In the convolutional neural network, there is a premise that elements are independent of each other, and input and output are also independent, such as a cat and a dog. However, in the real world, a plurality of elements are interconnected. Thus, the recurrent neural network is still required when the convolutional neural network is available. For example, the stock changes with a time. For another example, a person says "I like traveling, and the most favorite place is Yunnan. In the future, when there is a chance, I will go to (__). Herein, people should know that the person will go to "Yunnan," because people perform inference from the context. For a machine to perform inference from the context like a human, the RNN emerges. The RNN is intended to make the machine capable of memorizing like a human. Therefore, an output of the RNN needs to depend on current input information and historical memorized information.

(5) Loss Function

In a process of training a deep neural network, because it is expected that an output of the deep neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, a difference between the predicted value and the target value" needs to be predefined. This is a loss or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

A neural network may correct a size of a parameter in an initial neural network model in a training process by using an error back propagation (BP) algorithm, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

(7) Feedforward Network

The feedforward (feed forward) network is one of the simplest neural networks on which neurons are arranged hierarchically. Each neuron is connected only to the neurons of the previous layer. Each neuron receives an output from the previous layer and outputs it to the next layer. There is no feedback between layers. The feedforward network is more widely used and develops faster than other artificial neural networks.

(8) Attention Mechanism

The attention mechanism simulates an internal process of biological observation behavior, and is a mechanism that aligns internal experience with external feeling to increase observation precision of some regions. The mechanism can quickly select high-value information from a large amount of information by using limited attention resources. The attention mechanism is widely used in natural language processing tasks, especially machine translation, because the attention mechanism can quickly extract an important feature of sparse data. A self-attention mechanism is improvement of the attention mechanism. The self-attention mechanism becomes less dependent on external information and is better at capturing an internal correlation of data or features. An essential idea of the attention mechanism can be expressed by the following formula:

$$\text{Attention}(\text{Query}, \text{Source}) = \sum_{i=1}^{L_x} \text{Similarity}(\text{Query}, \text{Key}_i) * \text{Value}_i$$

Lx=‖Source‖ represents a length of a source. A meaning of the formula is that constituent elements in the source are considered to be constituted by a series of <Key, Value> data pairs. In this case, given an element Query in a target, a weight coefficient of a value corresponding to each key is obtained by calculating similarity or a correlation between Query and the key, and then weighted summation is performed on values to obtain a final attention value. Therefore, in essence, the attention mechanism is to perform weighted summation on values of the elements in the source, where Query and a key are used to calculate a weight coefficient of a corresponding value. Conceptually, the attention mechanism can be understood as a mechanism for selecting a small amount of important information from a large amount of information and focusing on the important information, and ignoring most unimportant information. A focusing process is reflected in calculation of a weight coefficient. A larger weight indicates that a value corresponding to the weight is more focused. In other words, the weight indicates importance of information, and the value indicates the information corresponding to the weight. The self-attention mechanism may be understood as an intra attention mechanism. The attention mechanism occurs between the element Query in the target and all elements in the source. The self-attention mechanism is an attention mechanism that occurs between elements in the source or between elements in the target, and may also be understood as an attention calculation mechanism in a special case of Target=Source. A specific calculation process of the self-attention mechanism is the same except that a calculation object changes.

(9) Transformer Layer

Compared with previous neural networks (such as a recurrent neural network and a convolutional neural network), the transformer layer includes an attention mechanism module and a feedforward network module. The attention mechanism module obtains a corresponding weight value by calculating correlation between words and finally obtains context-sensitive word representation, and is a core part of the transformer structure. The feedforward network module may perform further transformation on the obtained word representation to obtain final output of the transformer. In addition to the two important modules, a residual layer and linear normalization may be included.

(10) Voice Recognition

A voice is a carrier of a language symbol system. It is emitted by human pronunciation organs and carries a specific language meaning.

A main task of voice recognition (auto speech recognition) is to transform voice into text. The voice is the most natural, smooth, and convenient way of information exchange in human society. When a voice signal is converted into a text, text content in the voice signal is obtained, or text information is obtained more accurately, to implement human-computer interaction.

Figure 2:
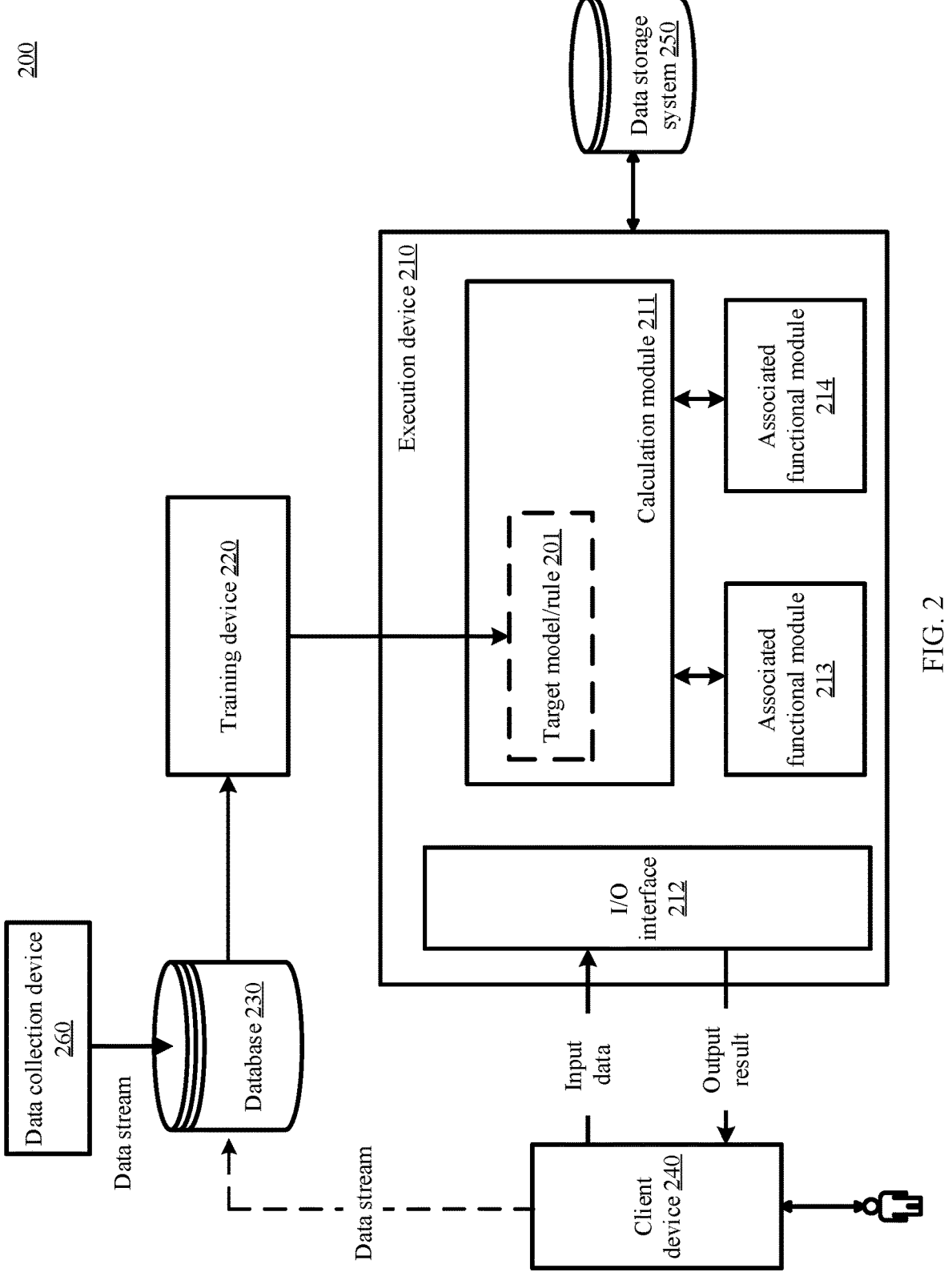
FIG. 2 is a schematic diagram of a system architecture according to an embodiment of this application.

FIG. 2 is a schematic diagram of a system architecture 200 according to an embodiment of this application. A data capturing device 260 is configured to capture language data and store the language data in a database 230, and a training device 220 generates a target model/rule 201 based on training data maintained in the database 230. The following describes in more detail how the training device 220 obtains the target model/rule 201 based on the training data. The target model/rule 201 can process input data.

FIG. 2 is a schematic diagram of functional modules in a data processing process. Corresponding to a diagram of the actual application scenario in FIGS. 1A-1C, a client device 240 may be the user equipment in FIGS. 1A-1C, and an execution device 210 and a data storage system 250 may be integrated into the user equipment when the user equipment in FIGS. 1A-1C has a comparatively strong data processing capability. In some embodiments, the execution device 210 and the data storage system 250 may also be integrated into the data processing device in FIG. 1. The database 230, the training device 220, and the data capturing device 260 may be correspondingly integrated into the data processing device in FIG. 1, and may be disposed in a cloud or in another network server.

The target model/rule obtained by the training device 220 may be applied to different systems or devices. In FIG. 2, an I/O interface 212 is configured for an execution device 210, to exchange data with an external device. A "user" may input data to the I/O interface 212 by using a client device 240.

The execution device 210 may invoke data, code, and the like in a data storage system 250, and may further store, in the data storage system 250, data, instructions, and the like.

The calculation module 211 processes input data by using the target model/rule 201. Specifically, the target model/rule 201 may be modules in the audio processing system 600 shown in FIG. 7, the audio processing system 700 shown in FIG. 9, or the audio processing system 800 shown in FIG. 12.

Finally, the I/O interface 212 returns the processing result to the client device 240, and provides the processing result to the user.

More deeply, the training device 220 may generate, for different targets, corresponding target models/rules 201 based on different data, to provide a better result for the user.

In a case shown in FIG. 2, the user may manually specify data to be input to the execution device 210, for example, may perform an operation in an interface provided by the I/O interface 212. In another case, the client device 240 may automatically input data to the I/O interface 212 and obtain a result. If the client device 240 needs to obtain permission of the user for automatically inputting the data, the user may set corresponding permission on the client device 240. The user can view, on the client device 240, a result output by the execution device 210. The result may be specifically presented in a specific manner, for example, display, sound, or an action. The client device 240 may also be used as a data collection end to store the captured audio in the database 230.

It should be noted that FIG. 2 is merely a schematic diagram of a system architecture according to an embodiment of this application. A location relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

As shown in FIG. 2, the target model/rule 201 is obtained through training by the training device 220. The target model/rule 201 may be a neural network in this application in this embodiment of this application. Specifically, the neural network provided in this embodiment of this application may be, for example, a CNN, a deep convolutional neural network (DCNN), a cyclic neural network (recurrent neural network, RNN), a feedforward neural network, an attention mechanism network, or a transformer network. These network structures are widely applied to the voice recognition field.

Because the CNN is a very common neural network, a structure of the CNN is described below in detail with reference to FIG. 3. As described in the foregoing basic concept descriptions, the convolutional neural network is a deep neural network with a convolutional structure, and is a deep learning architecture. The deep learning architecture refers to multi-level learning performed at different abstract levels by using a machine learning algorithm. As a deep learning architecture, the CNN is a feedforward (feedforward) artificial neural network, and each neuron in the feedforward artificial neural network may respond to audio input into the feedforward artificial neural network.

Figure 3:
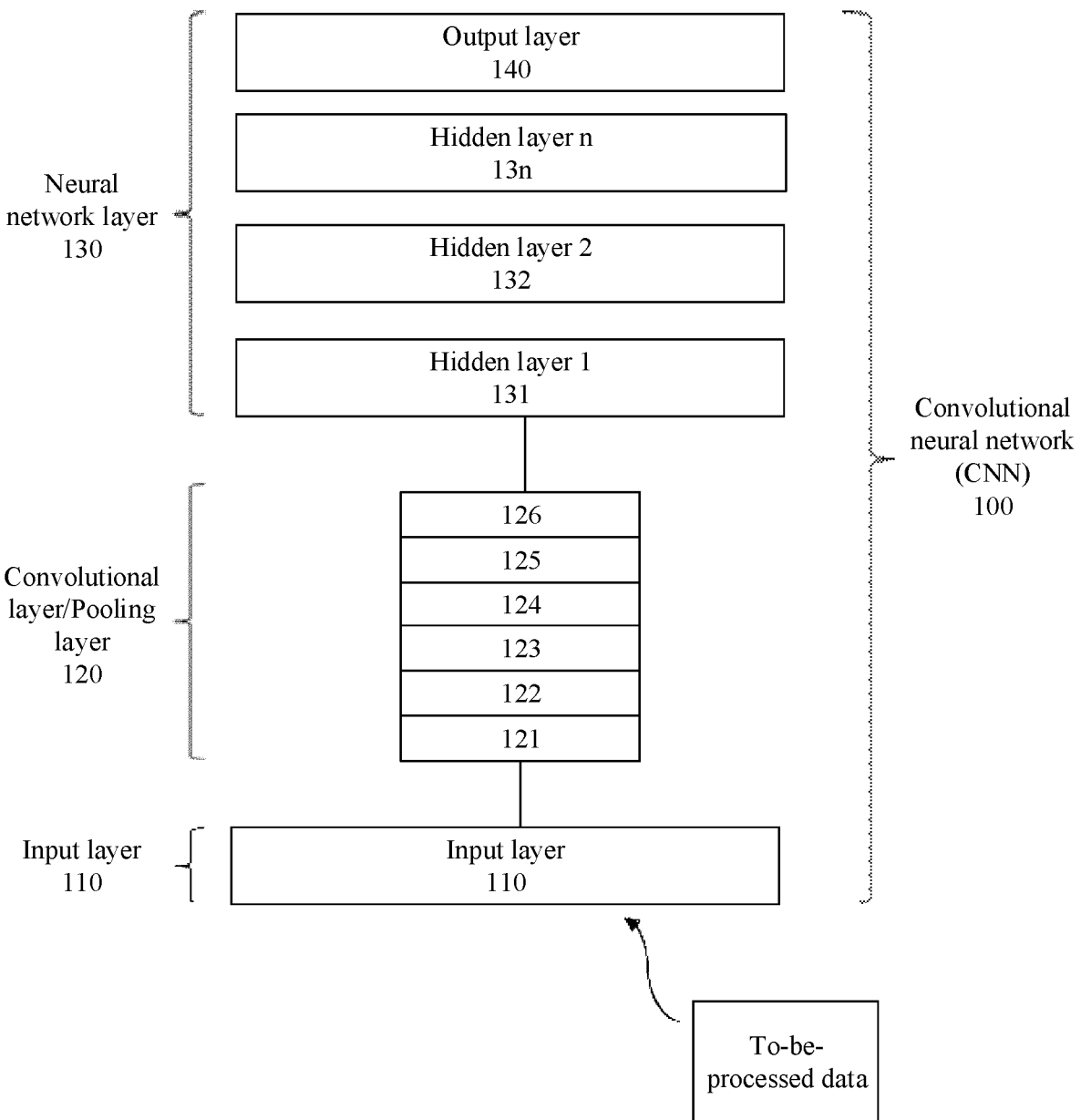
FIG. 3 is a schematic diagram of a structure of a convolutional neural network.

As shown in FIG. 3, a convolutional neural network (CNN) 100 may include an input layer 110, a convolutional layer/pooling layer 120, and a neural network layer 130. The pooling layer is optional.

Convolutional Layer/Pooling Layer 120:
Convolutional Layer:

As shown in FIG. 3, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. That is, an output of a convolutional layer may be used as an input of a subsequent pooling layer, or may be used as an input of another convolutional layer to continue a convolution operation.

The convolutional layer 121 is used as an example. The convolutional layer 121 may include a plurality of convolution operators. The convolution operator is also referred to as a kernel. In natural language processing, the convolution operator functions as a filter that extracts specific information from input voice or semantic information. The convolution operator may be a weight matrix essentially, and the weight matrix is usually predefined.

Weight values in the weight matrices need to be obtained through massive training in an actual application. Each weight matrix formed by using the weight values obtained through training may be used to extract information from the input audio, to enable the convolutional neural network 100 to perform correct prediction.

When the convolutional neural network 100 includes a plurality of convolutional layers, a larger quantity of general features are usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer:

Because a quantity of training parameters usually needs to be reduced, the pooling layer usually needs to be periodically introduced after a convolutional layer. To be specific, for the layers 121 to 126 in the 120 shown in FIG. 3, one convolutional layer may be followed by one pooling layer, or a plurality of convolutional layers may be followed by one or more pooling layers. In natural language data processing, a sole purpose of the pooling layer is to reduce a space size of the data.

Neural Network Layer 130:

After processing is performed by the convolutional layer/pooling layer 120, the convolutional neural network 100 still cannot output required output information. As described above, the convolutional layer/pooling layer 120 performs only feature extraction and reduces the parameters brought by the input data. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131, 132, . . . , and 13$n$ shown in FIG. 3) and an output layer 140. Parameters included in the plurality of hidden layers may be obtained through pre-training based on related training data of a specific task type. For example, the task type may include voice or semantics recognition, classification, generation, or the like.

The plurality of hidden layers included in the neural network layer 130 are followed by the output layer 140, namely, the last layer of the entire convolutional neural network 100. The output layer 140 has a loss function similar to a categorical cross entropy, and the loss function is specifically used to compute a prediction error. Once forward propagation (for example, propagation from the layers 110 to 140 in FIG. 3 is forward propagation) of the entire convolutional neural network 100 is completed, back propagation (for example, propagation from the layers 140 to 110 in FIG. 3 is back propagation) is started to update weight values and deviations of the layers mentioned above, to reduce a loss of the convolutional neural network 100 and an error between a result output by the convolutional neural network 100 by using the output layer and an ideal result.

It should be noted that the convolutional neural network 100 shown in FIG. 3 is merely used as an example of a convolutional neural network. During specific application, the convolutional neural network may alternatively exist in a form of another network model, for example, a plurality of parallel convolutional layers/pooling layers shown in FIG. 4, and extracted features are all input to the entire neural network layer 130 for processing.

Figure 5:
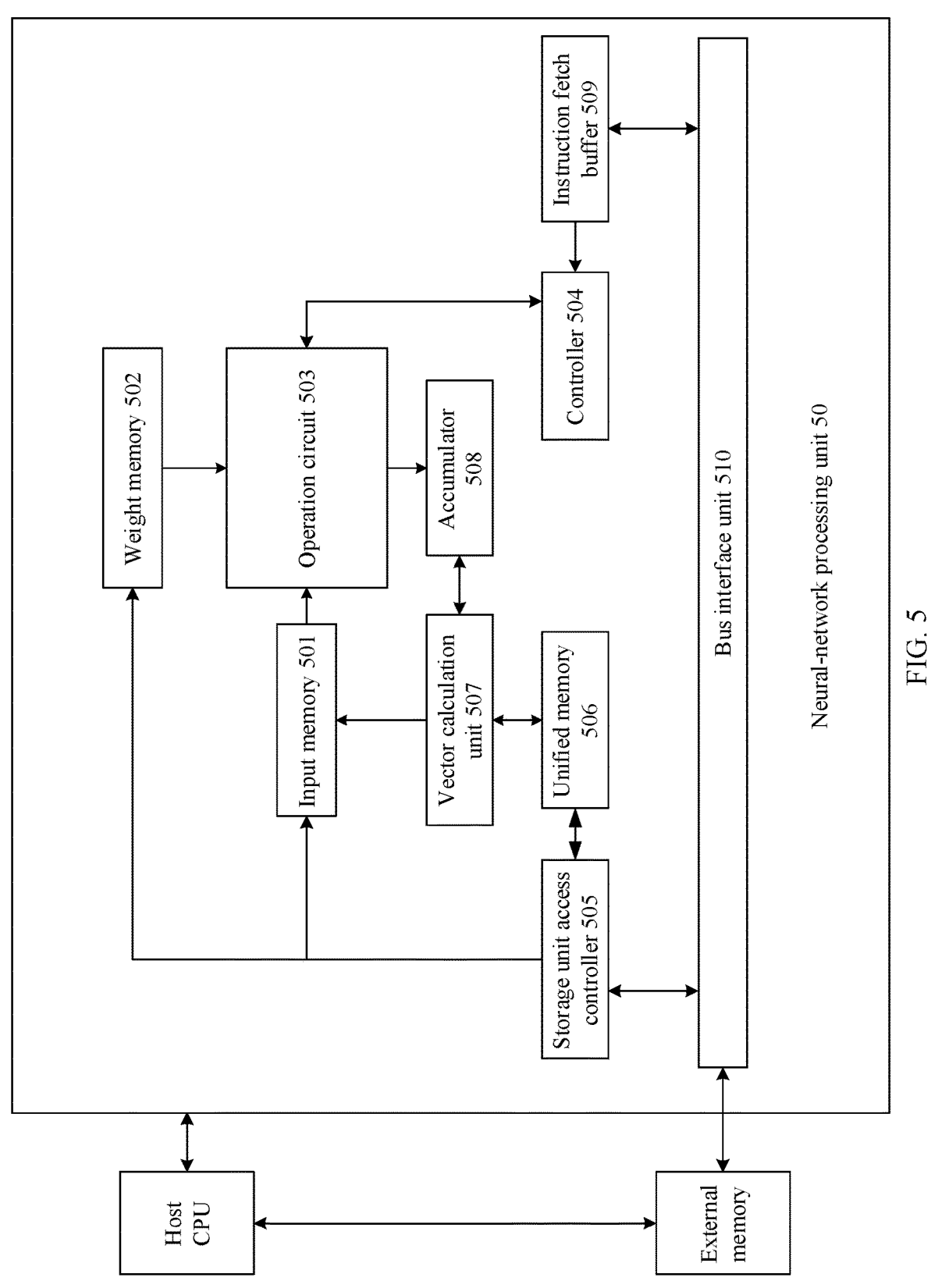
FIG. 5 is a schematic diagram of a hardware structure of a chip according to an embodiment of this application.

FIG. 5 is a diagram of a hardware structure of a chip according to an embodiment of this application.

Figure 4:
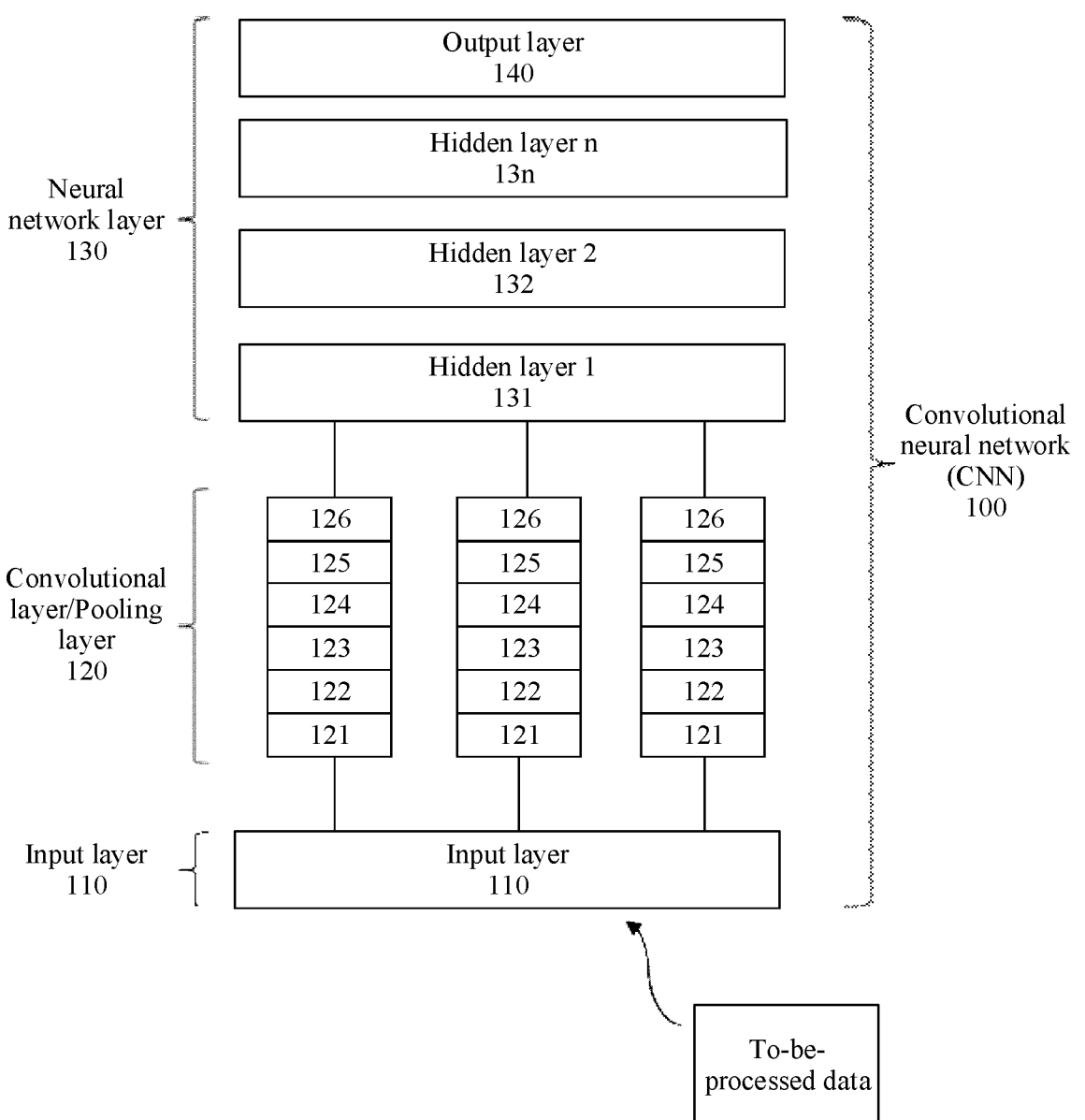
FIG. 4 is a schematic diagram of another structure of a convolutional neural network.

The convolutional neural network-based algorithms shown in FIG. 3 and FIG. 4 may be implemented in an NPU chip shown in FIG. 5.

A neural-network processing unit NPU 50 NPU, as a coprocessor, is mounted to a host CPU, and the host CPU allocates a task. A core part of the NPU is an operation circuit 50, and a controller 504 controls the operation circuit 503 to extract data in a memory (a weight memory or an input memory) and perform an operation.

In some implementations, the operation circuit 503 includes a plurality of processing units (Process Engine, PE) inside. In some implementations, the operation circuit 503 is a two-dimensional systolic array. The operation circuit 503 may alternatively be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit fetches, from a weight memory 502, data corresponding to the matrix B, and caches the data on each PE in the operation circuit. The operation circuit extracts data of the matrix A from an input memory 501, to perform a matrix operation on the matrix B, and a partial result or a final result of an obtained matrix is stored in an accumulator (accumulator) 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling, batch normalization, or local response normalization, at a non-convolutional/non-FC layer in a neural network.

In some implementations, the vector calculation unit 507 can store a processed output vector in a unified memory 506. For example, the vector computation unit 507 may apply a non-linear function to the output of the operation circuit 503, for example, a vector of an accumulated value, to generate an activation value. In some implementations, the vector calculation unit 507 generates a normalized value, a combined value, or both a normalized value and a combined value. In some implementations, the processed output vector can be used as an activation input to the operation circuit 503, for example, to be used in a subsequent layer in the neural network.

The unified memory 506 is configured to store input data and output data.

A storage unit access controller 505 (Direct Memory Access Controller, DMAC) is configured to transfer input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM for short), a high bandwidth memory (HBM), or another readable and writable memory.

An operation of each layer in the convolutional neural network shown in FIG. 3 may be performed by the operation circuit 503 or the vector computation unit 507.

The execution device 210 in FIG. 2 described above can perform the steps of the audio processing method in this embodiment of this application. The CNN model shown in FIG. 2 and the chip shown in FIG. 3 may also be configured to perform the steps of the audio processing method in this embodiment of this application.

With reference to FIG. 1A to FIG. 5, the foregoing describes in detail basic content of the neural network and the related apparatus and model in this embodiment of this application.

Figure 6:
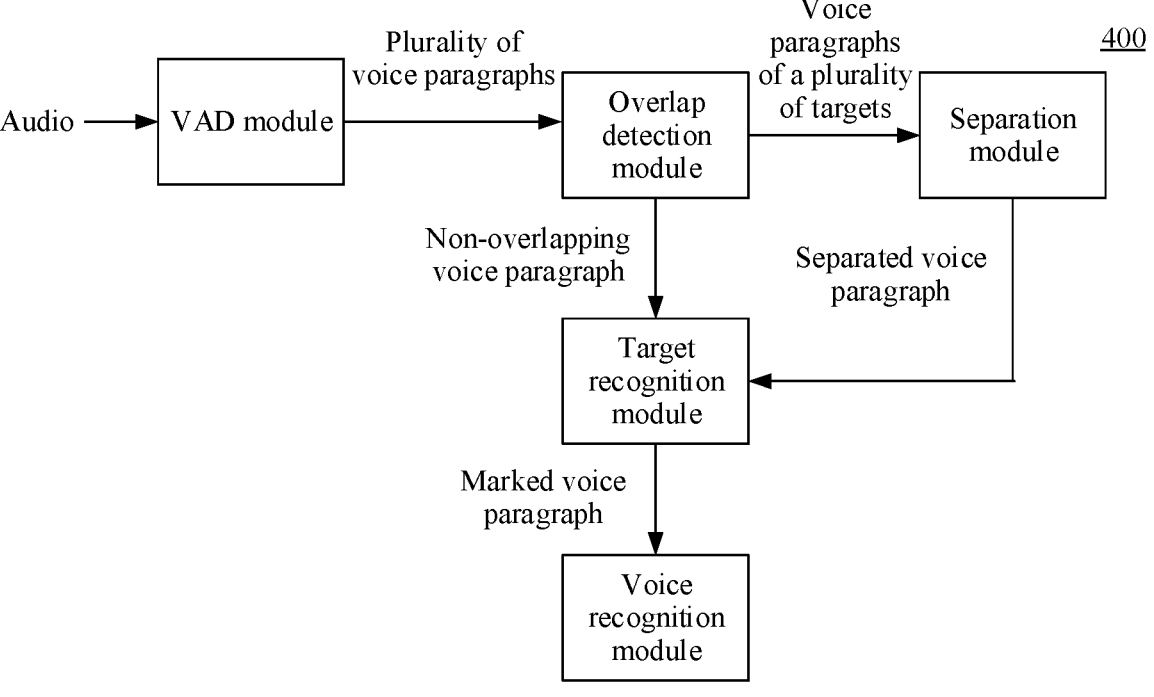
FIG. 6 is a schematic diagram of a structure of an audio processing system.

FIG. 6 is a schematic diagram of a structure of an audio processing system.

The audio processing system 400 includes a voice activity detection (VAD) module, an overlap detection module, an overlap separation module, a target recognition module, and a voice recognition module.

Audio is input to the VAD module. The VAD module uses a VAD technology to detect and separate a plurality of voice paragraphs. The VAD may be also called voice endpoint detection or voice boundary detection, and is used to detect a start time and an end time of a voice, so that a long silence period can be recognized and eliminated in a sound signal stream. Each voice paragraph is a valid voice segment, that is, voices in each voice paragraph are continuous.

The voice paragraph is input into the overlap detection module, to determine whether target voice overlapping exists in the voice paragraph.

Voice overlapping means that voices of a plurality of targets exist in a voice paragraph at a same time, that is, the voices of the plurality of targets overlap at a same time.

The overlap detection module may also be understood as detecting whether the voices of the plurality of targets exist in the voice paragraph. Because the voice paragraph is processed by the VAD module, that the voices of the plurality of targets exist in the voice paragraph may mean that there may be no time interval between voices of two targets, or voices of two targets overlap in terms of time. A case in which there is no time interval between the voices of the two targets almost does not occur. Therefore, the detecting whether the voices of the plurality of targets exist in the voice paragraph may also be understood as detecting whether the voices of the plurality of targets overlap.

If voice overlapping exists in the voice paragraph, the voice paragraph may be input into the overlap separation module to perform voice separation, to obtain a plurality of separated voice paragraphs. Each voice paragraph corresponds to one target. Then, each separated voice paragraph is input into the target recognition module.

If voice overlapping does not exist in the voice paragraph, the voice paragraph in which voice overlapping does not exist is input into the target recognition module.

The target recognition module is configured to mark the input voice paragraph, to determine a speaker corresponding to the voice paragraph.

Then, the marked voice paragraph is input into the voice recognition module. The voice recognition module recognizes semantics of each voice paragraph, and records the semantics and a corresponding target.

Audio can be obtained by capturing sounds in scenarios such as a conference and a discussion. In the scenarios such as the conference and the discussion, there is usually only one speaker at a time, that is, voice overlapping does not exist in most times. Overlapping detection is performed on each voice paragraph, which occupies a large quantity of processing resources.

In addition, during voice recognition, generally, voice recognition is performed according to a sequence of voices in audio. In other words, the marked voice paragraphs are input into the voice recognition module according to a time sequence in the audio, to recognize semantics of each voice paragraph. Accuracy of recognizing the semantics in the foregoing manner is low.

To resolve the foregoing problem, an embodiment of this application provides an audio processing method. Audio is processed by using an audio processing system.

Figure 7:
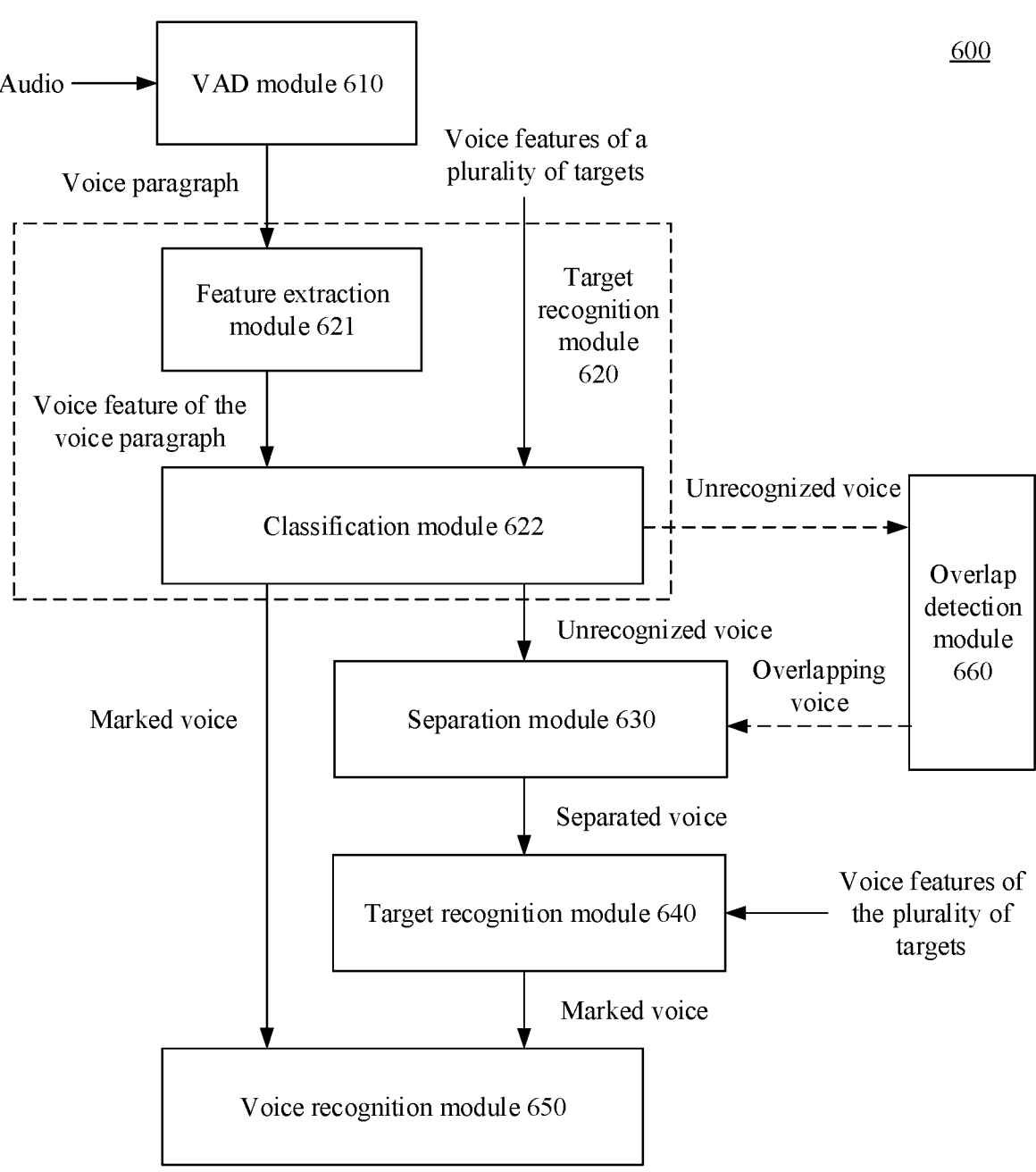
FIG. 7 is a schematic diagram of a structure of an audio processing system according to an embodiment of this application.

The following describes in detail the audio processing system in this embodiment of this application with reference to FIG. 7.

FIG. 7 is a schematic diagram of a structure of an audio processing system according to an embodiment of this application.

The audio processing system 600 is configured to process audio. The audio may be obtained by capturing sounds in scenarios such as a conference. The audio processing system 600 is configured to record semantics corresponding to voices of a plurality of targets in the audio.

The audio processing system 600 includes a VAD module 610, a target recognition module 620, a separation module 630, a target recognition module 640, and a voice recognition module 650. The target recognition module 620 and the target recognition module 640 may be a same module or different modules. In some embodiments, the target recognition module 620 and the target recognition module 640 may be a same module.

The VAD module 610 in the audio processing system 600 may include an AI model for performing valid voice segment separation, which is referred to as a VAD model. Alternatively, the VAD module 610 may invoke the VAD model through an interface, to implement a function of performing valid voice segment separation on input audio. The VAD model may be a pre-trained neural network model, for example, a CNN, an RNN, or a feedforward network.

The VAD module 610 is configured to process the input audio to obtain a voice paragraph.

The VAD technology is used to detect and separate the valid voice segment based on an intermittent feature of the person's voice, so that the valid voice segment and a segment without sound or containing only background noise can be processed separately in subsequent steps.

The essence of the VAD technology is to extract a feature parameter of a voice signal that is different from that of a noise signal, and detect a valid voice segment in the input audio based on the feature parameter. Generally, parameters used for voice activity detection are mainly based on short-time energy, zero-crossing rate, entropy, time-domain, and frequency-domain fundamental tone detection.

Figure 8:
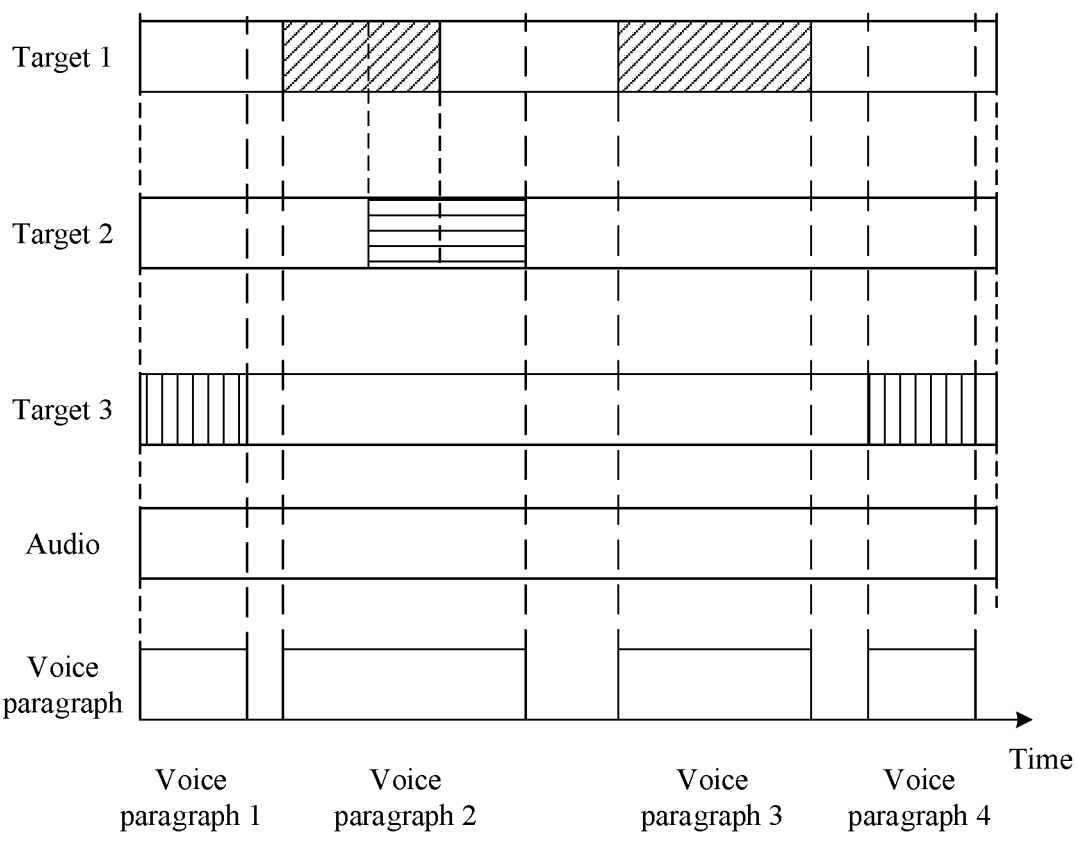
FIG. 8 is a schematic diagram of captured audio and a voice paragraph in the audio according to an embodiment of this application.

As shown in FIG. 8, sounds are captured when a target 1, a target 2, and a target 3 perform a session (conference), to obtain one segment of audio. In FIG. 8, for each target, a time is used as a horizontal coordinate, a shadow indicates that the target speaks, and no shadow indicates that the target does not speak. The audio is input into the VAD module 610, to obtain a voice paragraph 1, a voice paragraph 2, a voice paragraph 3, and a voice paragraph 4.

The target recognition module 620 may be configured to determine, based on voices of a plurality of targets, whether the voice paragraph corresponds to one of the plurality of targets.

Specifically, the target recognition module 620 includes a feature extraction module 621 and a classification module 622.

The feature extraction module 621 may include an AI model for extracting a voice feature, which is referred to as a feature extraction model. Alternatively, a feature segmentation module 130 may invoke the feature extraction model through an interface, to implement a function of extracting the voice feature. The feature extraction model performs system feature extraction on an input voice paragraph, to obtain a voice feature of the voice paragraph. The feature extraction model may be a pre-trained neural network model, for example, a CNN, an RNN, a feedforward network, an attention mechanism network, or a transformer.

The classification module 622 may include an AI model for classifying the voice paragraphs based on voice features of the plurality of targets and the voice features of the voice paragraphs, which is referred to as a classifier. Alternatively, the classification module 622 may invoke the classifier through an interface, to implement a function of classifying the voice paragraphs. The classifier may determine whether the voice feature of the voice paragraph matches a voice feature of one of the plurality of targets.

For example, the classification module 622 may use each target as a category. The classification module 622 may determine, based on the voice feature of the voice paragraph and the voice feature of each target, a probability that the voice paragraph belongs to each target.

If a probability that the voice paragraph belongs to a target in the plurality of targets is greater than a probability that the voice paragraph belongs to another target, and the probability that the voice paragraph belongs to the target is greater than or equal to a preset value, it is considered that the voice paragraph is a voice of the target. The target corresponding to the voice paragraph has been recognized, that is, the voice paragraph has been marked, and the voice paragraph is a marked voice.

If a probability that the voice paragraph belongs to any one of the plurality of targets is less than a preset value, the voice paragraph is an unrecognized voice.

The unrecognized voice may be input into the voice recognition module 650.

Voice separation can be performed for the unrecognized voice.

Specifically, the unrecognized voice may be input into the separation module 630.

As shown in FIG. 8, the voice paragraph 1 to the voice paragraph 4 are separately input into the target recognition module 620, and it may be determined that the voice paragraph 1 belongs to the target 3, the voice paragraph 3 belongs to the target 1, and the voice paragraph 4 belongs to the target 3. The voice paragraph 2 is the unrecognized voice.

The separation module 630 may include an AI model for performing voice separation, which is referred to as a voice separation model. Alternatively, the separation module 630 may invoke the voice separation model through an interface, to implement a function of separating the input unrecognized voice. The separation model may separate the input voice, and output at least one separated voice. Each separation voice corresponds to one target or one non-target. The separation model may be a pre-trained neural network model, for example, a CNN, an RNN, a feedforward network, an attention mechanism network, or a transformer. Generally, compared with the feature extraction model, a structure of the separation model is more complex.

A voice of the non-target other than the plurality of targets may exist in the voice paragraph. However, the target recognition module 620 can only recognize whether the voice paragraph corresponds to one target. The unrecognized voice may correspond to one non-target. Therefore, the output of the separation module 630 may be one or more separation voices.

When the output of the separation module 630 is one separated voice, the separated voice is the voice of the non-target. When the output of the separation module 630 is one separated voice, the separated voice may not be processed any more.

When the output of the separation module 630 is the plurality of separated voices, each of the plurality of separated voices is a voice of one target or one non-target.

Each separated voice and the voice features of the plurality of targets are input into the target recognition module 640. The target recognition module 640 may be configured to determine a target to which each separated voice belongs. The target recognition module 640 and the target recognition module 620 may be the same or different.

If a probability that the separated voice belongs to each target is less than a preset value, it may be considered that the separated voice does not belong to any one of the plurality of targets. No further processing may be performed on the separated voice.

If a probability that the separated voice belongs to a target is greater than a probability that the separated voice belongs to another target, and the probability that the separated voice belongs to the target is greater than a preset value, it may be considered that the separated voice belongs to the target. Therefore, the target corresponding to the separated voice is determined, that is, the separated voice is marked, and the separated voice is a marked voice.

As shown in FIG. 8, the voice paragraph 2 is input into the separation module 630, and two separated voices may be obtained. The two separated voices are separately input into the target recognition module 640, and it may be obtained that one of the two separated voices belongs to the target 1, and the other target voice belongs to the target 2.

In some embodiments, the unrecognized voice may be input into an overlap detection module 660.

The overlap detection module 660 may include an AI model for detecting whether voice overlapping exists in the unrecognized voice, which is referred to as an overlap detection model. Alternatively, the overlap detection module 660 may invoke the overlap detection model through an interface, to implement a function of detecting whether voice overlapping exists in the unrecognized voice. The overlap detection model may be a pre-trained neural network model, for example, a CNN, an RNN, a feedforward network, an attention mechanism network, or a transformer.

Because the target recognition module 620 is configured to mark only the voice of the target, the unrecognized voice may be the voice of the non-target, or may be an overlapping voice. The overlap detection module 660 may be used to determine whether the unrecognized voice is the overlapping voice.

When the unrecognized voice is the overlapping voice, the unrecognized voice (that is, the overlapping voice) may be input into the separation module 630.

When the unrecognized voice is not the overlapping voice, the unrecognized voice is the voice of the non-target, and the unrecognized voice may not be processed any more. Alternatively, the unrecognized voice may be marked as the voice of the non-target for subsequent processing. For example, the voice of the non-target may be input into the voice recognition module 650.

The unmarked voice may be input into the voice recognition module 650.

The voice recognition module 650 may include an AI model for performing semantic recognition, which is referred to as a voice recognition model. Alternatively, the voice recognition module 650 may invoke the voice recognition model through an interface, to implement a function of performing semantics recognition on the input audio. The voice recognition model may be a pre-trained neural network model, for example, a CNN, an RNN, a feedforward network, an attention mechanism network, or a transformer.

Based on time information and a target to which each marked voice belongs, semantics of the marked voice may be recorded.

Therefore, the audio processing system 600 may convert content of the audio into a text and record the text, to generate meeting minutes.

During a conference, voice overlapping occurs only in a few cases. In most cases, voice overlapping does not occur. To recognize the voice of each target, a target corresponding to each non-overlapping voice and a target corresponding to each separated voice need to be determined. The audio processing system 600 performs target recognition on each to-be-processed voice, and then performs voice separation on a to-be-processed voice that is not corresponding to the target. There is no need to perform overlap detection or voice separation on each to-be-processed voice, thereby reducing resource occupation.

When performing voice recognition on the plurality of targets, the voice recognition module 650 may process the voice of each target.

In a period of time, semantics corresponding to voices of one target is generally logically associated. During a conference, participants speak alternately, that is, a voice of each target appears alternately. Dependency between pre- and post-statements of one target is stronger. The voice of each target is processed, which can improve accuracy of voice recognition compared with a manner of performing voice recognition according to a time sequence.

The voices of the plurality of targets may be sequentially input into the voice recognition model. In this way, the voices of the plurality of targets are separately processed.

Alternatively, a plurality of voice recognition models may be used to process the voices of the plurality of targets. The plurality of voice recognition models may be in a one-to-one correspondence with the plurality of targets. In other words, each voice recognition model may be corresponding to one target, and is used to process a voice of one target.

The plurality of voice recognition models may perform concurrent voice recognition, to improve voice recognition efficiency.

In some cases, because time lengths of the voices of the plurality of targets are different, the time lengths of voices of some targets are very short. Each target corresponds to one voice recognition model, and occupies a large quantity of resources.

To reduce resource occupation, if a voice time of some targets is short, after a voice recognition model corresponding to the target completes voice recognition of the target, a resource occupied by the voice recognition model corresponding to the target may be released. Alternatively, after the voice recognition model corresponding to the target completes voice recognition of the target, voice recognition of another target is performed.

Alternatively, the plurality of voice recognition models may perform concurrent voice recognition, and one voice recognition model may recognize voices of a plurality of targets whose time is short. In this case, in a process in which the voice recognition module processes a voice of one of the targets, a voice of another target is not processed, and for the voice recognition model, the voices of the plurality of targets are separately processed in terms of time.

Further, the audio processing system 600 may further include a topic module.

The topic module may include an AI model for performing semantic classification, which is referred to as a topic model. Alternatively, the topic module 650 may invoke the topic model through an interface, to implement a function of classifying input semantics. The topic model may be a latent Dirichlet allocation (LDA) model.

The LDA model clusters the input semantics in an unsupervised learning manner. A clustering result is a topic, and a quantity of topics may be specified in advance. The semantics corresponding to the plurality of targets in the captured audio are input into the topic module, so that one or more topics corresponding to the captured audio may be obtained. The topic corresponding to the captured audio is recorded, which facilitates managing the captured audio and semantics of the captured audio.

The audio input into the audio processing system 600 may be audio captured by a microphone, or may be denoised audio.

Figure 9:
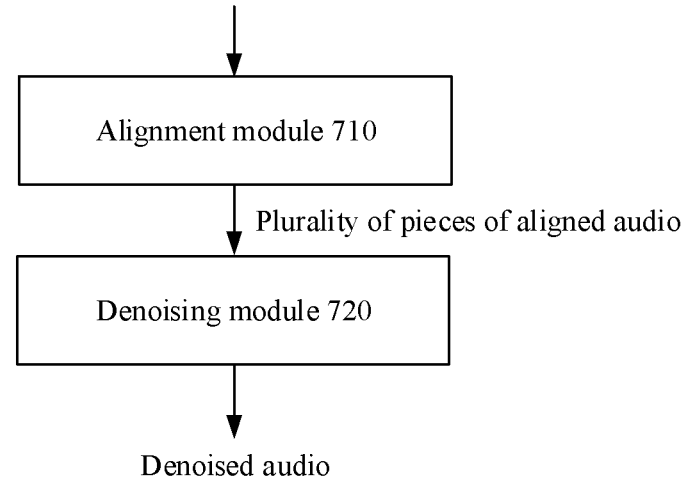
FIG. 9 is a schematic diagram of a structure of an audio processing system according to an embodiment of this application.

FIG. 9 is a schematic diagram of a structure of an audio processing system according to an embodiment of this application.

Voice recognition has a high requirement on voice quality. Generally, a microphone array can be used for recording. A position of a sound source may be determined based on a relative position between microphone units in the microphone array and a time difference between sounds captured by the microphone units. A sound transmitted to the microphone array from a position of a non-sound source may be removed based on the position of the sound source.

Therefore, the microphone array is used to capture the audio, denoising may be performed on the audio, only the voice is reserved and other sounds are removed, and then voice recognition is performed on the voice.

For example, in some scenarios such as outdoor discussion, the microphone array cannot be provided.

An embodiment of this application provides an audio processing system 700, to reduce noise in the captured audio without using the microphone array.

The audio processing system 700 includes an alignment module 710 and a denoising module 720.

The alignment module 710 is configured to determine aligned audio from each piece of captured audio based on time information of each piece of audio, where each piece of aligned audio is a part that is of one piece of captured audio and that is in a first time period.

A start time of the first time period is not earlier than a start time of the latest-starting audio in the plurality of pieces of audio. An end time of the first time period is not later than an end time of the earliest-ending audio in the plurality of pieces of audio. In other words, the plurality of pieces of audio each include a part of the first time period.

Figure 10:
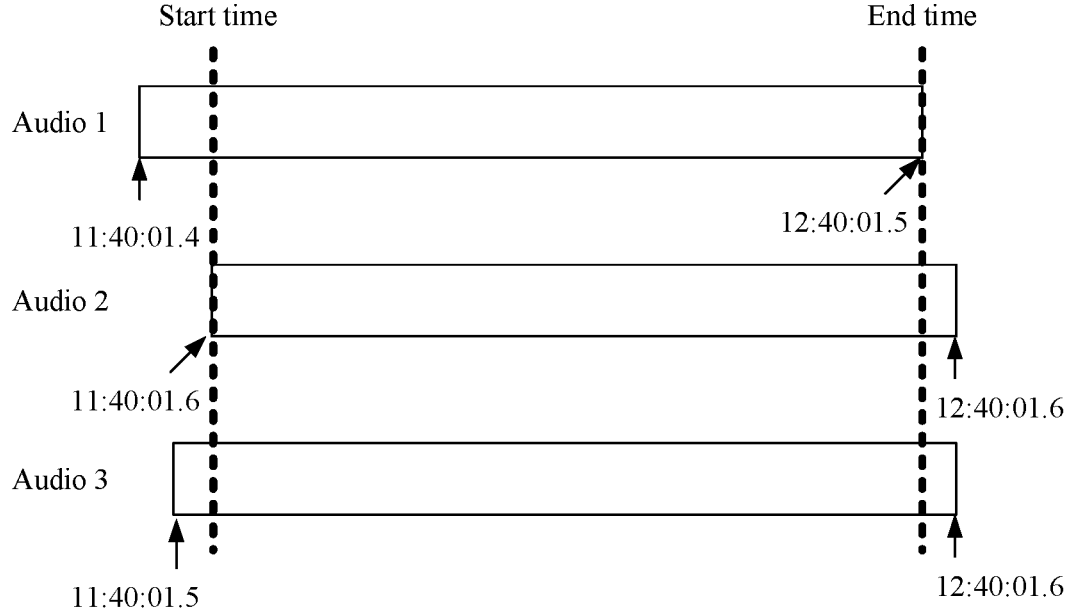
FIG. 10 is a schematic diagram of recording data.

As shown in FIG. 10, audio 1, audio 2, and audio 3 are respectively three pieces of audio received by the audio processing system 700.

A start time of the audio 1 is 11:40:01.4 and an end time is 12:40:01.5. A start time of the audio 2 is 11:40:01.6 and an end time is 12:40:01.6. A start time of the audio 3 is 11:40:01.5 and an end time is 12:40:01.6.

The start time of the latest-starting audio 2 in the audio 1, the audio 2, and the audio 3 is the earliest start time of the first time period. The end time of the earliest-ending audio 1 in the audio 1, the audio 2, and the audio 3 is the latest end time of the first time segment.

In other words, the longest time period in which terminal devices capture the audio together may be determined. Each piece of audio in the longest time period may be used as a voice channel in a virtual microphone array. A start time of the longest time period is used as a reference start time, and each piece of audio is processed in the longest time period after the reference start time according to a multi-channel filter algorithm.

Figure 11:
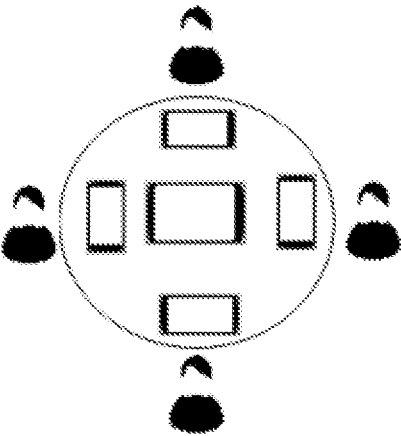
FIG. 11 is a schematic diagram of a recording scenario according to an embodiment of this application.

The audio 1, the audio 2, and the audio 3 may be captured by a same electronic device or different electronic devices. As shown in FIG. 11, users hold a conference around a table in a cafe. In this embodiment of this application, the user provides two or more terminal devices to capture audio. A quantity of terminal devices does not need to be consistent with a quantity of users, and the quantity of terminal devices may be greater than or less than the quantity of users. The user may perform recording by using a portable electronic device such as a mobile phone, a tablet computer, a wearable device, a notebook computer, an ultra-mobile personal computer (UMPC), a netbook, or a personal digital assistant (PDA), to obtain a plurality of pieces of captured audio.

Aligned audio in the first time period of each piece of captured audio is input into the denoising module 720.

The denoising module 720 removes noise in the audio according to the multi-channel filter algorithm.

A plurality of terminal devices may form a virtual microphone array, and noise may be removed according to the multi-channel filter algorithm, to implement voice enhancement.

Each piece of aligned audio is used as audio of a channel, and an energy spectral density of each channel, that is, frequency distribution of sounds in each channel, is determined. The frequency distribution of the sounds in each channel is used as a vector to calculate a covariance matrix. The covariance matrix is used to describe a correlation between variables in the vector. The covariance matrix is calculated, and a frequency correlation of a plurality of pieces of aligned audio can be determined.

A group of frequencies with a high correlation may be determined as a frequency group of the voice, and a frequency with a low correlation with the frequency group of the voice may be determined as a frequency group of noise. In some embodiments, a group of frequencies whose correlation is greater than a preset value may be determined as the frequency group of the voice.

Filtering processing is performed on the captured audio or the aligned audio based on the frequency group of the noise and the frequency group of the voice, to obtain denoised audio.

The audio processing system 700 processes, according to the multi-channel filter algorithm, a plurality of pieces of audio captured by the conference system, to remove noise in the pieces of audio and obtain pieces of denoised audio.

If no dedicated recording device is available for the conference, participants need to use their own terminals to capture the audio. According to the audio processing system provided in this embodiment of this application, two or more terminal devices are used to capture the audio. The denoising facilitates subsequent voice recognition.

In this scenario, a specific application program may be installed on a terminal device that captures audio. One terminal device is a conference initiation device, and transmits a synchronization message by using a wireless signal (including but not limited to using Bluetooth and a wireless network), for example, sets a conference recording start time.

The terminal device may receive an operation of the user to start audio capturing. Alternatively, the terminal device may receive the conference start time, and start audio capturing at the conference start time.

The conference system includes a plurality of terminal devices. In some embodiments, a first terminal device obtains a conference start time entered by a user, and sends the conference start time to another terminal device. At the conference start time, the plurality of terminal devices in the conference system start audio capturing at the same time.

In some other embodiments, the first terminal device obtains an indication of a user to immediately start audio capturing. The first terminal device sends indication information to another terminal device, to indicate the another terminal device to immediately start audio capturing.

In still some other embodiments, each terminal device separately receives instruction information of the user, to start audio capturing.

The first terminal device may be any one of the plurality of terminal devices, or a specific terminal device.

A conference end indication is similar to a conference start indication. The terminal device may receive an operation of the user to end audio collection. Alternatively, the terminal device may receive a conference end time, and stop audio collection at the conference end time.

After the conference ends, all personal devices stop recording and upload recording and related metadata to the electronic device such as a server. After the uploading is complete, the server performs time synchronization, denoising, and subsequent voice recognition. The related metadata may include but is not limited to a recording start time, a recording end time, and the like.

To determine time information of each piece of audio, the terminal device may receive a time server, to calibrate the time. A specific application may provide an interface, and the user may control, based on an operation in the interface, the terminal device to send a request to the time server, and receive information sent by the time server, to calibrate the time of the terminal device.

Figure 12:
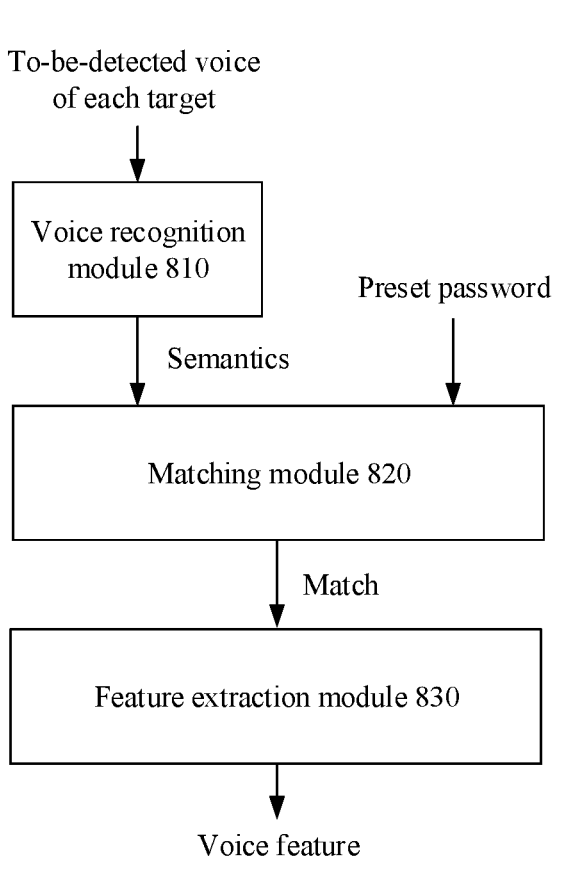
FIG. 12 is a schematic diagram of a structure of an audio processing system according to an embodiment of this application.

FIG. 12 is a schematic diagram of a structure of an audio processing system according to an embodiment of this application.

The audio processing system 800 is configured to obtain a voice feature of each target.

The audio processing system 800 includes a voice recognition module 810, a matching module 820, and a feature extraction module 830.

A preset password can be set. Each target reads the preset password. A plurality of electronic devices may capture a to-be-detected voice when the target reads the preset password. Each electronic device may capture a to-be-detected voice of each target.

Each to-be-detected voice captured by each electronic device may be processed by using the audio processing system 800.

The voice recognition module 810 may include an AI model for performing semantic recognition, which is referred to as a voice recognition model. Alternatively, the voice recognition module 810 may invoke the voice recognition model through an interface, to implement a function of performing semantics recognition on the input audio. The voice recognition model may be a pre-trained neural network model, for example, a CNN, an RNN, a feedforward network, an attention mechanism network, or a transformer.

The voice recognition module 810 is used to process the to-be-detected voice of each target, to obtain semantics of the to-be-detected voice of each target.

The semantics of the to-be-detected voice of each target is input into the matching module 820. The matching module 820 is configured to determine whether the input semantics matches the preset password. If the input semantics matches the preset password, that is, the input semantics includes the preset password (for example, the input semantics is the same as the preset password), the to-be-detected voice corresponding to the semantics is input into the feature extraction module 830. If the input semantics does not match the preset password, that is, the input semantics does not include the preset password, subsequent processing is not performed.

The feature extraction module 830 may include an AI model for extracting a voice feature, which is referred to as a feature extraction model. Alternatively, a feature segmentation module 830 may invoke the feature extraction model through an interface, to implement a function of extracting the voice feature. The feature extraction model performs feature extraction on an input voice, to obtain a voice feature of the voice. The feature extraction model may be a pre-trained neural network model, for example, a CNN, an RNN, a feedforward network, an attention mechanism network, or a transformer.

The feature extraction module 830 performs feature extraction on the input to-be-detected voice, to obtain a voice feature of a target corresponding to the to-be-detected voice. The voice feature of the target may also be understood as a voiceprint feature or voiceprint information of the target. The target corresponding to the voice may be recognized based on the voice feature of the target.

The user may enter a preset password in an interface provided by an application. Alternatively, the preset password may be randomly generated.

Each user can read the password. The one or more terminal devices capture a voice read by the user, to obtain a to-be-detected voice.

It may be determined whether semantics corresponding to to-be-detected voice captured by each terminal device is the same as the preset password. The terminal device that captures audio on the semantic to-be-detected voice and the preset password to-be-detected voice is determined as an audio capturing device in a conference system. In this case, the metadata related to the terminal device may also be a quantity of participants, voice features of the participants, and the like.

Certainly, it may also be determined that the terminal device is the audio capturing device in the conference system when the text input to the terminal device is the same as the preset password.

Figure 13:
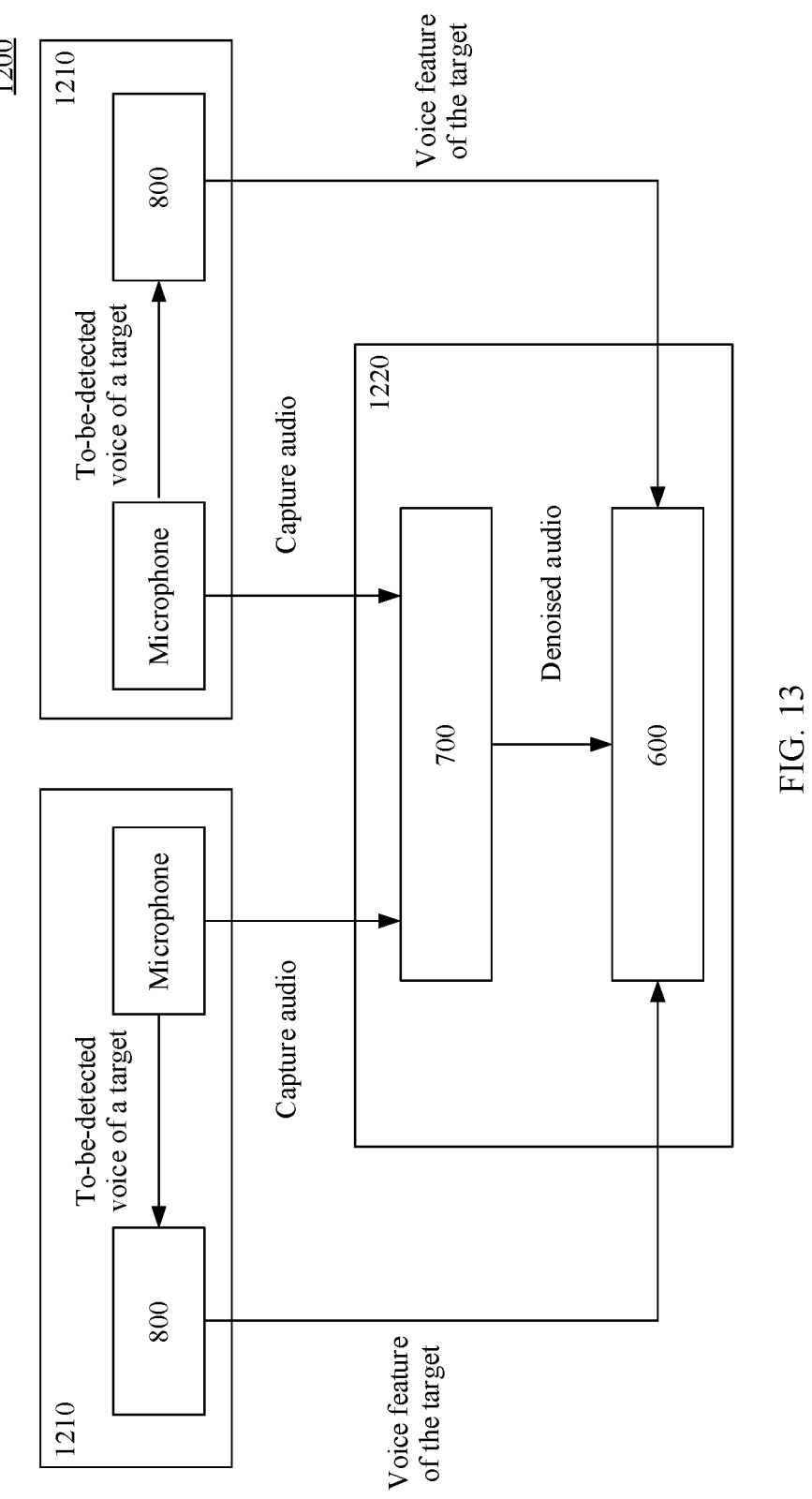
FIG. 13 is a schematic diagram of a structure of an audio processing system according to an embodiment of this application.

FIG. 13 is a schematic diagram of a structure of an audio processing system according to an embodiment of this application.

The audio processing system 1200 includes a server 1220 and a plurality of electronic devices 1210.

Each electronic device 1210 may include an audio processing system 800 and a microphone. The server 1220 may include an audio processing system 600 and an audio processing system 700.

The microphone in the electronic device 1210 is configured to capture a to-be-detected voice of one or more targets, and capture audio.

The audio processing system 800 in the electronic device 1210 processes a to-be-detected voice of each target captured by the electronic device 1210.

Due to a distance between the electronic device and the target, or the like, an electronic device may not be able to capture sounds of some targets.

If semantics of a to-be-detected voice of at least one target in to-be-detected voices of a plurality of targets matches the preset password, the electronic device may be configured to capture audio. If semantics of a to-be-detected voice of each target does not match the preset password, the electronic device no longer captures audio.

The electronic device 1210 may further obtain an identifier of each target, for example, a name, an identification (ID) number, or other information of each target. The electronic device 1210 may further send the identifier of each target to the server 1220.

Each electronic device transmits, to the audio processing system 600, a voice feature, of the target, obtained by the audio processing system 800 through processing.

The microphone in the electronic device 1210 performs sound collection to obtain captured audio. Then, the electronic device 1210 transmits the captured audio to the audio processing system 700 in the server 1220.

The plurality of electronic devices 1210 may determine a start time and an end time for performing audio collection.

For example, one electronic device 1210 in the plurality of electronic devices 1210 may determine a start time and an end time for performing audio collection, and send the times to another electronic device 1210 in the plurality of electronic devices 1210.

Compared with the manner of capturing the sound by using the microphone array, the electronic device 1210 configured to capture audio in this embodiment of this application may be an electronic device that can be carried by the user. The electronic device is placed in a flexible position, and can better capture a sound of each target.

The audio processing system 700 receives pieces of captured audio sent by the plurality of electronic devices, and performs denoising.

For one target, only one electronic device in the plurality of electronic devices may send a voice feature of the target to the audio processing system 600.

Alternatively, the audio processing system 800 in each electronic device may send a voice feature of each target to the audio processing system 600. For each target, the audio processing system 600 may receive a voice feature, of a target, sent by one or more electronic devices 1210.

For one target, the audio processing system 600 may fuse a plurality of received voice features to obtain a fused voice feature of the target. In subsequent processing, the audio processing system 600 uses the fused voice feature of the target as the voice feature of the target for processing.

Alternatively, for one target, the audio processing system 600 may use one of the plurality of received voice features as the voice feature of the target for subsequent processing.

The audio processing system 600 processes denoised audio based on the voice feature of each target, to obtain a record text of the captured audio. For a format of the record text, refer to FIG. 14 and FIG. 15.

As shown in FIG. 14, semantics of each target in the captured audio may be recorded according to a time sequence. Alternatively, as shown in FIG. 15, semantics of each target may be sorted, and the semantics of each target is recorded according to a time sequence.

FIG. 16 is a schematic flowchart of an AI model training method required by an audio processing system according to an embodiment of this application.

S1610: Obtain a plurality of training datasets and annotation information corresponding to each training dataset.

S1620: Input the training datasets into an initial AI system, where the initial AI system processes the training datasets to obtain output training information corresponding to the training datasets.

S1630: Adjust a parameter of the initial AI system based on the annotation information and the output training information, to minimize a difference between the output training information and the annotation information.

S1640: Continue to perform step S1620 and step S1630 by using an adjusted parameter value until an obtained loss value gradually converges, that is, a trained AI system is obtained.

For a VAD model, each training dataset may include one segment of training audio, and the annotation information corresponding to the training dataset may be a start time and an end time of a valid voice in the training audio. The trained AI system is the VAD model.

It should be understood that the training audio may include one or more segments of valid voices, and the annotation information corresponding to the training dataset includes a start time and an end time of each segment of the valid voice.

Audio is segmented in terms of time based on a start time and an end time of a valid voice in one segment of audio, to obtain a voice paragraph corresponding to the valid voice in the audio. The audio between the start time and the end time of the valid voice is the voice paragraph.

Alternatively, for a VAD model, each training dataset may include one segment of training audio, and the annotation information corresponding to the training dataset may be a valid voice in the training audio.

For the feature extraction models used in the audio processing system 600 and the audio processing system 800, each training dataset may include one segment of training voice paragraph, and the annotation information corresponding to the training dataset may be a target corresponding to the training voice paragraph.

The initial AI system may include an initial feature extraction model and an initial classification model. The initial feature extraction model is used to process the training dataset. The initial classification model is used to process an output result of the initial feature extraction model. A trained feature extraction model may be obtained by training the AI system.

It should be understood that each training voice paragraph corresponds to one target. In other words, each training voice paragraph is a voice of one target.

For the classifier used in the audio processing system 600, each training dataset may include voice features of a plurality of targets, and a voice feature obtained by processing one segment of training voice by using the feature extraction model obtained through training. The annotation information corresponding to the training dataset may be a target corresponding to the training voice. The trained AI system is the classifier.

Alternatively, for the feature extraction model and the classifier that are used in the target training module of the audio processing system 600, each training dataset may include voice features of a plurality of targets and one segment of training voice, and the annotation information corresponding to the training dataset may be a target corresponding to the training voice.

The initial AI system may include an initial feature extraction model and an initial classification model. The initial feature extraction model is used to process the training voice in the training dataset. The initial classification model is used to process the voice features of the plurality of targets in the training dataset and an output result of the initial feature extraction model. The trained AI system includes a trained feature extraction model and a trained classifier. It should be understood that the voice features of the plurality of targets in the training dataset may be obtained by processing the training voice by using another feature extraction model.

It should be understood that each training voice corresponds to one target.

For the separation model, each training dataset may include one training voice paragraph. The training voice paragraph includes a voice of at least one target. The annotation information corresponding to the training dataset may indicate a frequency corresponding to a voice of each target in the training voice paragraph. The trained AI system is the separation model.

Filtering processing is performed on the voice paragraph based on the frequency corresponding to the voice of each target, to obtain a voice corresponding to each target in the voice paragraph.

For the overlap detection model, each training dataset may include one training voice paragraph. The annotation information corresponding to the training dataset may indicate whether voice overlapping exists in the training voice paragraph. The trained AI system is the overlap detection model.

For the voice recognition model, each training dataset may include one training voice paragraph. The annotation information corresponding to the training dataset is semantics of the training voice paragraph. The trained AI system is the voice recognition model.

FIG. 17 is a schematic flowchart of an audio processing method according to an embodiment of this application. A method 1700 may be applied to a conference system. The conference system includes at least one audio capturing device. The method 1700 may be performed by a server or a terminal device.

S1710: Receive at least one segment of audio captured by the at least one audio capturing device.

S1720: Determine voices of a plurality of targets in the at least one segment of audio.

Noise may exist in the audio. Denoising may be performed on the audio.

The audio capturing device in the conference system may include a terminal device such as a mobile phone, a tablet computer, a wearable device, a notebook computer, a personal computer (PC), a netbook, a personal digital assistant (PDA), or another electronic device.

The conference system may include one or more terminal devices, and each terminal device is configured to capture audio.

Position information of a microphone of each terminal device may be obtained, and a position of a sound source is determined based on the position information of the microphone, to remove a sound other than the sound source, thereby removing noise.

Generally, the terminal device is movable. When the terminal device can be in a moving state, it is difficult to accurately obtain a position of the microphone. Denoising is performed according to a multi-channel filter algorithm.

In other words, in a case in which the at least one audio capturing device includes a plurality of terminal devices, and the at least one segment of audio includes audio captured by each terminal device, the plurality of segments of audio may be processed according to the multi-channel filter algorithm, to obtain denoised audio.

Denoising is performed on the captured audio according to the multi-channel filter algorithm, and accurate position information of the audio capturing device does not need to be obtained. Therefore, the plurality of terminal devices may be used to capture the audio in place of a microphone array, thereby reducing a requirement on the audio capturing device.

A group of frequencies with high correlation may be determined as a frequency group of the voice according to the multi-channel filter algorithm, and a frequency with low correlation with the frequency group of the voice may be determined as a frequency group of noise. In some embodiments, a group of frequencies whose correlation is greater than a preset value may be determined as the frequency group of the voice. The plurality of segments of audio may be processed according to the multi-channel filter algorithm, so that a sound corresponding to a frequency of noise is removed, and one segment of denoised audio is obtained.

Then, the voices of the plurality of targets are determined from the denoised audio.

Because the plurality of segments of audio are captured by the plurality of terminal devices, start times or end times of all the segments of audio may be different. To achieve better denoising effect, time synchronization of the plurality of segments of audio may be implemented before denoising.

Specifically, time information of each of the plurality of segments of audio may be obtained to implement time synchronization of the plurality of segments of audio. Then, the plurality of synchronized segments of audio are processed according to the multi-channel filter algorithm. For details, refer to the description in FIG. 10.

To reduce a calculation amount of S1730, voice extraction may be performed, and only the voice is processed in S1730. A voice in the audio is determined according to a VAD algorithm.

Voices in the plurality of segments of audio are determined according to the VAD algorithm.

The plurality of segments of audio received in step S1710 may be processed according to the VAD algorithm, to obtain a voice in each segment of audio.

After the voices in the plurality of segments of audio are obtained, denoising may be further performed on the voices in the plurality of segments of audio.

Preferably, the denoised audio may be processed according to the VAD algorithm, to obtain at least one voice. Then, a voice of each of the plurality of targets may be determined from the at least one voice.

A voice paragraph in the audio may be extracted by using the VAD. Each voice paragraph is used as a to-be-processed voice.

When voice overlapping exists, semantics corresponding to the voice cannot be accurately determined through voice recognition. To record semantics of a voice corresponding to each target in the audio, it may be determined whether voice overlapping exists in the to-be-processed voice, and voice separation is performed on the to-be-processed voice with voice overlapping, to obtain a separated voice. Target recognition and voice recognition are performed on the separated voice and a voice paragraph without voice overlapping, to record the semantics of the voice corresponding to each target in the audio.

In some cases, voices of a plurality of targets in the to-be-processed voice may overlap. To implement semantic recognition of the voice, an overlapping voice needs to be separated.

In a scenario such as a conference, generally, only one target speaks at one time point, that is, a quantity of voice paragraphs with voice overlapping is very small, and a proportion is very low. Determining whether voice overlapping is performed on each voice paragraph occupies a large quantity of resources.

It may be determined whether the to-be-processed voice is a voice of a first target in the plurality of targets.

When the to-be-processed voice is not the voice of the first target, voice separation is performed on the to-be-processed voice to obtain at least one separated voice. Then, a target corresponding to the at least one separated voice may be recognized.

In some embodiments, the plurality of targets may be separately used as the first target, and whether the to-be-processed voice is a voice of any one of the plurality of targets is determined. When the to-be-processed voice is not the voice of any one target, voice separation is performed on the to-be-processed voice.

It may be determined, based on a voice feature of the target, whether the to-be-processed voice is the voice of the target.

When it is determined that the voice paragraph is not the voice of the target, voice separation is performed on the voice paragraph, and determining whether a separated voice corresponds to the target can reduce resources occupied by audio processing.

Due to factors such as a failure to obtain voice features of all the targets, when it is determined, based on voice features of a part of targets, that the to-be-processed voice is not a voice of one of the part of targets, the to-be-processed voice may be a voice of another target, and voice overlapping does not exist.

Further, when the to-be-processed voice is not the voice of the first target, it may be further determined whether voice overlapping exists in the to-be-processed voice. When voice overlapping exists in the to-be-processed voice, voice separation is performed on the to-be-processed voice.

S1730: Perform voice recognition on a voice of each of the plurality of targets, to obtain semantics corresponding to the voice of each target.

In S1730, voice recognition is performed on the voice of each of the plurality of targets based on different targets, instead of performing voice recognition according to a time sequence of voices in the audio. Voice recognition may be performed based on a semantic logical association relationship with a same target, thereby improving accuracy of recognizing semantics.

Further, the voices of the plurality of targets are input into a plurality of voice recognition models, and the plurality of voice recognition models are used for concurrent voice recognition to determine semantics corresponding to the voice of each target.

In other words, voice recognition may be performed in a multi-thread parallel manner, and voices corresponding to different targets may be recognized at the same time, thereby reducing a time required for voice recognition.

Before S1720, a voice feature of each target may be obtained. The voice feature of the target may be received, the voice feature of the target may be read from the storage module, or the voice feature of the target may be detected.

A to-be-detected voice may be obtained. Voice recognition is performed on the to-be-detected voice to determine semantics of the to-be-detected voice. When the semantics of the to-be-detected voice is preset content, feature extraction is performed on the to-be-detected voice to obtain a voice feature of the first target.

Therefore, when it is determined whether the to-be-processed voice is the voice of the first target, it is determined, based on the voice feature of the first target, whether the to-be-processed voice is the voice of the first target.

It should be understood that all the plurality of targets may be first targets.

When it is determined that the semantics of the to-be-detected voice is the preset content, it is determined that the to-be-detected voice is the voice of the first target.

In addition, an identifier of the first target may be further obtained. The identifier of the first target may be a name, an identification (ID) number, an employee ID, or the like of the first target. Therefore, the identifier of the first target is recorded in the meeting minutes, to facilitate query of the meeting minutes.

After S1730, the meeting minutes are output, and the meeting minutes include the semantics corresponding to the voice of each target.

For a specific format and content of the meeting minutes, refer to descriptions in FIG. 14 and FIG. 15.

The meeting minutes may display a summary of a voice record of each target and provide voice and text records of each target for query and analysis. A text record, of a target, that needs to be obtained can be selected and a complete voice or text record is queried through clicking. The voice or text record of each target may be presented by different categories, including query by time segment, query by discussion topic, query by each target, and the like.

In some embodiments, the at least one audio includes a plurality of segments of continuous voices.

In S1720, a voice of at least one target may be determined from each segment of the continuous voice.

After S1730, the semantics corresponding to the voice of each target in each segment of the continuous voice may be further processed, to obtain a topic corresponding to the voice of each target in each segment of the continuous voice.

Because the semantics corresponding to the voice of each target is obtained by processing the voice of each target, the semantics is accurate. Therefore, after S1730, the topic corresponding to the voice of each target in each segment of the continuous voice is determined, so that the topic is determined more accurately.

Further, first query information may be further obtained. The first query information includes topic information indicating a first topic.

First audio data may be output based on a topic corresponding to the voice of each target in each segment of the continuous voice. The first audio data includes at least one voice corresponding to the first topic in the plurality of voices.

Further, second query information may be further obtained. The second query information includes target information indicating a second target.

Second audio data may be output, and the second audio data includes a voice of the second target.

It should be understood that the second target and the first target may be a same target, or may be different targets.

FIG. 18 is a schematic flowchart of a query method according to an embodiment of this application.

S1810: Obtain query information, where the query information includes topic information indicating a first topic.

S1820: Output first audio data based on a correspondence between a plurality of voices and a plurality of topics, where the first audio data includes at least one voice corresponding to the first topic in the plurality of voices, each of the plurality of voices corresponds to one target, a topic of each voice is obtained by processing semantics corresponding to the voice, the semantics corresponding to each voice is obtained by performing voice recognition on the voice corresponding to each target, the plurality of voices are obtained based on audio data captured by at least one audio capturing device in a conference system, and the audio data captured by the at least one audio capturing device includes voices of a plurality of targets.

For a manner of processing the audio data captured by the at least one audio capturing device, refer to the description in FIG. 17.

Further, the query information further includes target information indicating a first target, and the at least one voice in the first audio data is a voice of the first target.

FIG. 19 shows an electronic apparatus according to an embodiment of this application.

The electronic apparatus 3000 includes a storage module 3010 and a processing module 3020.

The storage module 3010 is configured to store program instructions.

When the program instructions are executed in the processing module 3020, the processor is configured to perform the method shown in FIG. 17 or FIG. 18.

When the processing module 3020 performs the method shown in FIG. 17, the electronic apparatus 3000 may also be referred to as an audio processing apparatus.

Specifically, the audio processing apparatus may be applied to a conference system. The conference system includes at least one audio capturing device.

The processing module 3020 is configured to receive at least one segment of audio captured by the at least one audio capturing device.

The processing module 3020 is further configured to determine voices of a plurality of targets in the at least one segment of audio.

The processing module 3020 is further configured to perform voice recognition on a voice of each of the plurality of targets, to obtain semantics corresponding to the voice of each target.

Optionally, the processing module 3020 is further configured to determine whether a to-be-processed voice is a voice of a first target in the plurality of targets, where the to-be-processed voice is determined from the at least one segment of audio.

The processing module 3020 is further configured to: when the to-be-processed voice is not the voice of the first target, perform voice separation on the to-be-processed voice to obtain a separated voice.

The processing module 3020 is further configured to recognize a target corresponding to the separated voice.

Optionally, the processing module 3020 is further configured to: when the to-be-processed voice is not the voice of the first target, determine whether voice overlapping exists in the to-be-processed voice.

The processing module 3020 is further configured to: when voice overlapping exists in the to-be-processed voice, perform voice separation on the to-be-processed voice.

Optionally, the processing module 3020 is further configured to obtain a to-be-detected voice.

The processing module 3020 is further configured to perform voice recognition on the to-be-detected voice to determine semantics of the to-be-detected voice.

The processing module 3020 is further configured to: when the semantics of the to-be-detected voice is preset content, perform feature extraction on the to-be-detected voice to obtain a voice feature of the first target.

The processing module 3020 is further configured to determine, based on the voice feature of the first target, whether the to-be-processed voice is the voice of the first target.

Optionally, the processing module 3020 is further configured to determine a plurality of segments of continuous voices in the at least one segment of audio according to a voice status detection VAD algorithm.

The processing module 3020 is further configured to determine the voice of each of the plurality of targets from the plurality segments of continuous voices.

Optionally, the at least one audio capturing device includes a plurality of terminal devices, and the at least one segment of audio includes audio captured by each terminal device.

The processing module 3020 is further configured to process the plurality of segments of audio according to a multi-channel filter algorithm to obtain denoised audio.

The processing module 3020 is further configured to determine the voices of the plurality of targets from the denoised audio.

Optionally, the processing module 3020 is further configured to obtain time information of each of the plurality of segments of audio to implement time synchronization of the plurality of segments of audio.

That the processing module 3020 is further configured to process the plurality of segments of audio according to a multi-channel filter algorithm includes: processing, according to the multi-channel filter algorithm, the plurality of synchronized segments of audio.

Optionally, the processing module 3020 is further configured to input the voices of the plurality of targets into a plurality of voice recognition models, where the plurality of voice recognition models are used for concurrent voice recognition.

Optionally, the processing module 3020 is further configured to output meeting minutes, where the meeting minutes include the semantics corresponding to the voice of each target.

Optionally, the at least one audio includes a plurality of segments of continuous voices.

The processing module 3020 is further configured to determine a voice of at least one target from each segment of the continuous voice.

The processing module 3020 is further configured to process semantics corresponding to a voice of each target in each segment of the continuous voice, to obtain a topic corresponding to the voice of each target in each segment of the continuous voice.

Optionally, the processing module 3020 is further configured to obtain first query information, where the first query information includes topic information indicating a first topic.

The processing module 3020 is further configured to output first audio data based on the topic corresponding to the voice of each target in each segment of the continuous voice, where the first audio data includes at least one voice corresponding to the first topic.

Optionally, the processing module 3020 is further configured to obtain second query information, where the second query information includes target information indicating a second target in the plurality of targets.

The processing module 3020 is further configured to output second audio data, where the second audio data includes a voice of the second target.

When the processing module 3020 performs the method shown in FIG. 18, the electronic apparatus 3000 may be understood as a query apparatus.

Specifically, the processing module 3020 is configured to obtain query information, where the query information includes topic information indicating a first topic.

The processing module 3020 is further configured to output first audio data based on a correspondence between a plurality of voices and a plurality of topics, where the first audio data includes at least one voice corresponding to the first topic in the plurality of voices, each of the plurality of voices corresponds to one target, a topic of each voice is obtained by processing semantics corresponding to the voice, the semantics corresponding to each voice is obtained by performing voice recognition on the voice corresponding to each target, the plurality of voices are obtained based on audio data captured by at least one audio capturing device in a conference system, and the audio data captured by the at least one audio capturing device includes voices of a plurality of targets.

Optionally, the query information further includes target information indicating a first target, and the at least one voice in the first audio data is a voice of the first target.

Figure 20:
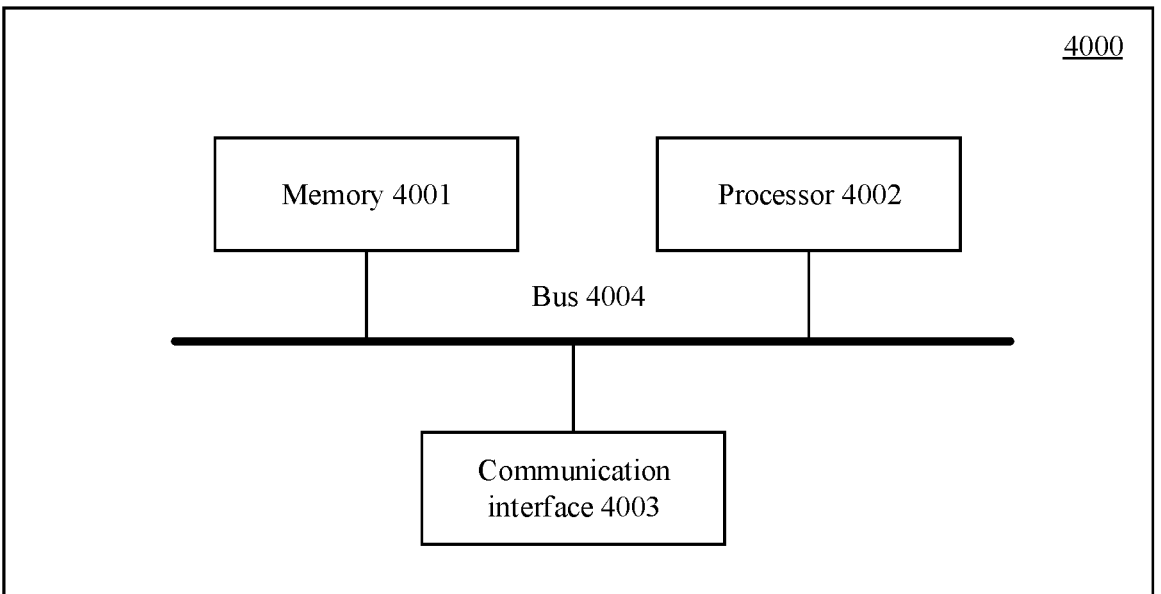
FIG. 20 is a schematic diagram of a structure of an audio processing apparatus according to an embodiment of this application.

FIG. 20 is a schematic diagram of a hardware structure of an audio processing apparatus according to an embodiment of this application. The audio processing apparatus 4000 shown in FIG. 19 includes a memory 4001, a processor 4002, a communication interface 4003, and a bus 4004. The memory 4001, the processor 4002, and the communication interface 4003 are communicatively connected to each other through the bus 4004.

The memory 4001 may be a ROM, a static storage device, or a RAM. The memory 4001 may store a program. When the program stored in the memory 4001 is executed by the processor 4002, the processor 4002 and the communication interface 4003 are configured to perform the steps of the audio processing method in embodiments of this application.

The processor 4002 may be a general-purpose CPU, a microprocessor, an ASIC, a GPU, or one or more integrated circuits, and is configured to execute a related program, to implement a function that needs to be executed by a unit in the audio processing apparatus in this embodiment of this application, or perform the audio processing method in the method embodiments of this application.

Alternatively, the processor 4002 may be an integrated circuit chip and has a signal processing capability. For example, the processor 4002 may be the chip shown in FIG. 4. In an implementation process, the steps of the audio processing method in embodiments of this application may be completed by using a hardware integrated logic circuit in the processor 4002 or instructions in a form of software.

The foregoing processor 4002 may alternatively be a general-purpose processor, a DSP, an ASIC, an FPGA or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor, a function that needs to be performed by a unit included in the audio processing apparatus in embodiments of this application, or performs the audio processing method in embodiments of this application.

The communication interface 4003 uses a transceiver apparatus, for example but not limited to, a transceiver, to implement communication between the apparatus 4000 and another device or a communication network. For example, audio may be obtained through the communication interface 4003.

The bus 4004 may include a path for transmitting information between the components (for example, the memory 4001, the processor 4002, and the communication interface 4003) of the apparatus 4000.

Figure 21:
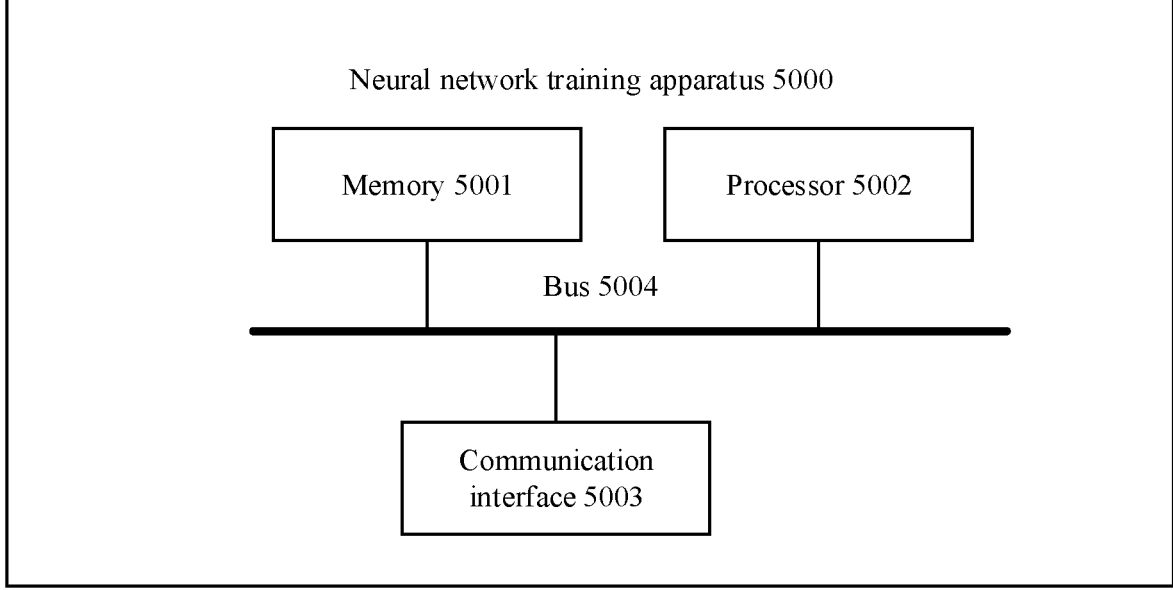
FIG. 21 is a schematic diagram of a structure of a neural network training apparatus according to an embodiment of this application.

FIG. 21 is a schematic diagram of a hardware structure of a neural network training apparatus according to an embodiment of this application. Similar to the foregoing apparatuses 3000 and 4000, a neural network training apparatus 5000 shown in FIG. 21 includes a memory 5001, a processor 5002, a communication interface 5003, and a bus 5004. The memory 5001, the processor 5002, and the communication interface 5003 are communicatively connected to each other through the bus 5004.

The neural network training apparatus 5000 shown in FIG. 21 may be used to train a neural network, and a neural network obtained through training may be used to perform the audio processing method in embodiments of this application.

Specifically, the apparatus shown in FIG. 21 may obtain training data and a to-be-trained neural network from the outside through the communication interface 5003, and then the processor trains the to-be-trained neural network based on the training data.

It should be noted that, although only the memory, the processor, and the communication interface are shown in each of the apparatus 4000 and the apparatus 5000, in a specific implementation process, a person skilled in the art should understand that the apparatus 4000 and the apparatus 5000 each may further include another component necessary for normal running. In addition, according to a specific requirement, a person skilled in the art should understand that the apparatus 4000 and the apparatus 5000 may further include hardware components for implementing other additional functions. In addition, a person skilled in the art should understand that the apparatus 4000 and the apparatus 5000 may include only components necessary for implementing embodiments of this application, but not necessarily include all the components shown in FIG. 13 and FIG. 14.

It should be understood that, the processor in embodiments of this application may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory in embodiments of this application may be a volatile memory or a nonvolatile memory, or may include a volatile memory and a nonvolatile memory. The nonvolatile memory may be a read-only memory (, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

The descriptions of procedures corresponding to the foregoing accompanying drawings have respective focuses. For a part that is not described in detail in a procedure, refer to related descriptions of another procedure.

An embodiment of this application further provides a computer-readable storage medium. The computer-readable storage medium has program instructions. When the program instructions are directly or indirectly executed, the foregoing method is implemented.

An embodiment of this application further provides a computer program product including instructions. When the computer program product is run on a computing device, the computing device is enabled to perform the foregoing method, or the computing device is enabled to implement a function of the foregoing apparatus.

An embodiment of this application further provides a chip system. The chip system includes at least one processor, and when program instructions are executed in the at least one processor, the foregoing method is implemented.

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the computer instructions or the computer programs are loaded or executed on a computer, the procedure or functions according to embodiments of this application are all or partially generated. The computer may be a general-purpose computer, a dedicated computer, a computer network, or other programmable apparatuses. The computer instructions may be stored on a computer-readable storage medium, or transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium, or the like. The semiconductor medium may be a solid state drive.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio processing method, applied to a conference system, wherein the conference system comprises at least one audio capturing device which comprises a plurality of terminal devices, and the method comprises:

receiving at least one segment of audio captured by the at least one audio capturing device;

determining voices of a plurality of targets in the at least one segment of audio;

performing semantic recognition, by at least one of AI models, on a voice of each of the plurality of targets, to obtain semantics corresponding to the voice of each target;

obtaining a to-be-detected voice;

performing semantic recognition on the to-be-detected voice to determine semantics of the to-be-detected voice; and in response to the semantics of the to-be-detected voice being preset content, performing feature extraction on the to-be-detected voice to obtain a voice feature of a first target.

2. The method according to claim 1, wherein the determining the voices of the plurality of targets in the at least one segment of audio comprises:

determining whether a to-be-processed voice is a voice of the first target in the plurality of targets, wherein the to-be-processed voice is determined from the at least one segment of audio;

in response to the to-be-processed voice not being the voice of the first target, performing voice separation on the to-be-processed voice to obtain a separated voice; and recognizing a target corresponding to the separated voice.

3. The method according to claim 2, further comprising:

in response to the to-be-processed voice not being the voice of the first target, determining whether voice overlapping exists in the to-be-processed voice; and wherein the performing the voice separation on the to-be-processed voice comprises: in response to voice overlapping existing in the to-be-processed voice, performing voice separation on the to-be-processed voice.

4. The method according to claim 2, wherein the determining whether the to-be-processed voice is the voice of the first target comprises: determining, based on the voice feature of the first target, whether the to-be-processed voice is the voice of the first target.

5. The method according to claim 1, wherein the determining the voices of the plurality of targets in the at least one segment of audio comprises:

determining a plurality of segments of continuous voices in the at least one segment of audio according to a voice status detection (VAD) algorithm; and determining the voice of each of the plurality of targets from the plurality of segments of continuous voices.

6. The method according to claim 1, wherein the at least one segment of audio comprises audio captured by each terminal device; and wherein the determining the voices of the plurality of targets in the at least one segment of audio comprises:

processing a plurality of segments of audio according to a multi-channel filter algorithm to obtain denoised audio; and determining the voices of the plurality of targets from the denoised audio.

7. The method according to claim 6, further comprising:

obtaining time information of each of the plurality of segments of audio to implement time synchronization of the plurality of segments of audio; and wherein the processing the plurality of segments of audio according to the multi-channel filter algorithm comprises: processing, according to the multi-channel filter algorithm, a plurality of synchronized segments of audio.

8. The method according to claim 1, wherein the performing the semantic recognition on the voice of each of the plurality of targets comprises:

inputting the voices of the plurality of targets into a plurality of semantic recognition models, wherein a plurality of voice semantic recognition models are used for concurrent semantic recognition.

9. The method according to claim 1, further comprising:

outputting a meeting minutes, wherein the meeting minutes comprise the semantics corresponding to the voice of each target.

10. The method according to claim 1, wherein the at least one segment of audio comprises a plurality of segments of continuous voices;

wherein the determining the voices of the plurality of targets in the at least one segment of audio comprises: determining a voice of at least one target in each segment of the continuous voice; and wherein the method further comprises: processing semantics corresponding to a voice of each target in each segment of the continuous voice, to obtain a topic corresponding to the voice of each target in each segment of the continuous voice.

11. The method according to claim 10, further comprising:

obtaining first query information, wherein the first query information comprises topic information indicating a first topic; and outputting first audio data based on the topic corresponding to the voice of each target in each segment of the continuous voice, wherein the first audio data comprises at least one voice corresponding to the first topic.

12. The method according to claim 11, further comprising:

obtaining second query information, wherein the second query information comprises target information indicating a second target in the plurality of targets; and outputting second audio data, wherein the second audio data comprises a voice of the second target.

13. A query method, applied to a query apparatus, the method comprising:

obtaining query information, wherein the query information comprises topic information indicating a first topic; and outputting first audio data based on a correspondence between a plurality of voices and a plurality of topics, wherein the first audio data comprises at least one voice corresponding to the first topic in the plurality of voices, and each of the plurality of voices corresponds to one target, wherein a topic of each voice is obtained by processing semantics corresponding to the voice, and the semantics corresponding to each voice is obtained by performing semantic recognition by at least one of AI models, on the voice corresponding to each target, wherein the plurality of voices are obtained based on audio data captured by at least one audio capturing device which comprises a plurality of terminal devices, in a conference system, and the audio data comprises voices of a plurality of targets;

wherein a to-be-detected voice is obtained and semantic recognition on the to-be-detected voice is performed to determine semantics of the to-be-detected voice, and wherein in response to the semantics of the to-be-detected voice being preset content, feature extraction on the to-be-detected voice is performed to obtain a voice feature of a first target.

14. The method according to claim 13, wherein the query information further comprises target information indicating the first target, and the at least one voice in the first audio data is a voice of the first target.

15. An audio processing apparatus, comprising a processor and a memory;

the memory is configured to store program instructions; and the processor is configured to execute the program instructions, to perform the following operations including:

receiving at least one segment of audio captured by at least one audio capturing device;

determining voices of a plurality of targets in the at least one segment of audio;

performing semantic recognition by at least one of AI models, on a voice of each of the plurality of targets, to obtain semantics corresponding to the voice of each target; and obtaining a to-be-detected voice;

performing semantic recognition on the to-be-detected voice to determine semantics of the to-be-detected voice;

in response to the semantics of the to-be-detected voice being preset content, performing feature extraction on the to-be-detected voice to obtain a voice feature of a first target; and wherein the audio processing apparatus comprises a plurality of terminal devices.

16. A query apparatus, comprising a processor and a memory;

the memory is configured to store program instructions; and the processor is configured to execute the program instructions, to perform the method according to claim 11.

17. A non-transitory computer-readable storage medium, wherein the computer-readable storage medium stores computer instructions, and when the computer instructions are executed by a computing device, the computing device is enabled to perform the method according to claim 1.

18. A chip, wherein the chip comprises a processor and a data interface, and the processor reads, through the data interface, instructions stored in a memory, to perform the method according to claim 1.

19. The audio processing apparatus according to claim 15, wherein the operation of determining the voices of the plurality of targets in the at least one segment of audio comprises:

determining whether a to-be-processed voice is a voice of the first target in the plurality of targets, wherein the to-be-processed voice is determined from the at least one segment of audio;

in response to the to-be-processed voice not being the voice of the first target, performing voice separation on the to-be-processed voice to obtain a separated voice; and recognizing a target corresponding to the separated voice.

20. The audio processing apparatus according to claim 19, wherein the operations further include:

in response to the to-be-processed voice not being the voice of the first target, determining whether voice overlapping exists in the to-be-processed voice; and wherein the performing the voice separation on the to-be-processed voice comprises: in response to voice overlapping existing in the to-be-processed voice, performing voice separation on the to-be-processed voice.

\*    \*    \*    \*    \*